US010938567B2

(12) United States Patent
Martino et al.

(10) Patent No.: US 10,938,567 B2
(45) Date of Patent: Mar. 2, 2021

(54) PARALLEL-CHAIN ARCHITECTURE FOR BLOCKCHAIN SYSTEMS

(71) Applicant: Kadena, LLC, Brooklyn, NY (US)

(72) Inventors: William Martino, Brooklyn, NY (US); Stuart Popejoy, Brooklyn, NY (US); Monica Quaintance, Brooklyn, NY (US)

(73) Assignee: KADENA LLC, Brooklyn, NY (US)

(*) Notice: Subject to any disclaimer, the term of this patent is extended or adjusted under 35 U.S.C. 154(b) by 0 days.

(21) Appl. No.: 16/129,756

(22) Filed: Sep. 12, 2018

(65) Prior Publication Data

US 2019/0081793 A1    Mar. 14, 2019

Related U.S. Application Data

(60) Provisional application No. 62/557,314, filed on Sep. 12, 2017, provisional application No. 62/620,638, filed on Jan. 23, 2018.

(51) Int. Cl.
| | |
|---|---|
| *H04L 9/32* | (2006.01) |
| *G06Q 20/22* | (2012.01) |
| *H04L 9/08* | (2006.01) |
| *G06Q 20/06* | (2012.01) |

(52) U.S. Cl.
CPC ......... *H04L 9/3236* (2013.01); *G06Q 20/065* (2013.01); *G06Q 20/223* (2013.01); *H04L 9/0894* (2013.01); *G06Q 20/06* (2013.01); *G06Q 2220/00* (2013.01); *H04L 2209/38* (2013.01); *H04L 2209/56* (2013.01)

(58) Field of Classification Search
CPC ............ H04L 9/3236; H04L 2209/38; H04L 2209/56; G06Q 20/06; G06Q 20/36
See application file for complete search history.

(56) References Cited

U.S. PATENT DOCUMENTS

| | | | |
|---|---|---|---|
| 6,684,389 B1 | 1/2004 | Tanaka et al. | |
| 10,158,611 B2* | 12/2018 | Castagna | ............ H04L 63/0428 |
| 10,193,695 B1* | 1/2019 | Endress | ................ H04L 9/3239 |
| 2016/0098723 A1* | 4/2016 | Feeney | .............. G06Q 20/4016 |
| | | | 705/75 |
| 2016/0330034 A1* | 11/2016 | Back | ...................... G06Q 20/06 |
| 2016/0342977 A1* | 11/2016 | Lam | ........................ G06Q 20/02 |
| 2017/0085545 A1 | 3/2017 | Lohe et al. | |
| 2017/0103167 A1 | 4/2017 | Shah | |

(Continued)

FOREIGN PATENT DOCUMENTS

| | | | | |
|---|---|---|---|---|
| WO | WO2017021154 | | 2/2017 | |
| WO | WO-2018232494 A1 * | 12/2018 | ............. | G06Q 40/04 |

(Continued)

OTHER PUBLICATIONS

Written Opinion for PCT/US2018/043577 dated Oct. 19, 2018; 10 pps.

(Continued)

*Primary Examiner* — Zachary A. Davis
(74) *Attorney, Agent, or Firm* — Michael Downs; Downs IP Law LLC

(57) ABSTRACT

Systems, apparatus, methods, and articles of manufacture are described herein for providing for a proof-of-work parallel-chain architecture for a distributed ledger system (e.g., a blockchain) with efficient throughput and security.

28 Claims, 17 Drawing Sheets

(56) References Cited

U.S. PATENT DOCUMENTS

| | | | |
|---|---|---|---|
| 2017/0126702 | A1 | 5/2017 | Krishnamurthy |
| 2017/0132619 | A1* | 5/2017 | Miller ................ G06Q 20/3829 |
| 2017/0232300 | A1* | 8/2017 | Tran ........................ H04L 67/12 |
| | | | 434/247 |
| 2017/0264428 | A1 | 9/2017 | Seger, II |
| 2017/0337534 | A1* | 11/2017 | Goeringer ............. H04L 9/3239 |
| 2017/0352031 | A1 | 12/2017 | Collin |
| 2018/0032383 | A1 | 2/2018 | Surcouf et al. |
| 2018/0082390 | A1 | 3/2018 | Leidner et al. |
| 2018/0089758 | A1* | 3/2018 | Stradling ........... G06Q 20/3829 |
| 2018/0211213 | A1 | 7/2018 | Vivier |
| 2018/0225660 | A1 | 8/2018 | Champman et al. |
| 2018/0322588 | A1 | 11/2018 | Linne |
| 2018/0337769 | A1* | 11/2018 | Gleichauf ............. H04L 9/3239 |
| 2018/0343114 | A1 | 11/2018 | Ben-Ari |
| 2019/0014116 | A1 | 1/2019 | Khi et al. |
| 2019/0050855 | A1 | 2/2019 | Martino et al. |

FOREIGN PATENT DOCUMENTS

| | | |
|---|---|---|
| WO | WO2019023286 | 1/2019 |
| WO | WO2019055585 | 3/2019 |

OTHER PUBLICATIONS

International Search Report for PCT/US2018/043577 dated Oct. 19, 2018; 3 pps.

Maesa et al. "Blockchain Based Access Control." In: IFIP International Conference on Distributed Applications and Interoperable Systems DAIS, May 24, 2017., https://link.springer.com/chapter/10.1007/978-3-319-59665-5_15>, pp. 2-4.

Outchakoucht et al. "Dynamic Access Control Policy based on Blockchain and Machine Learning for the Internet of Things." International Journal of Advanced Computer Science and Applications, vol. 8, No. 7, Jan. 2017; https://www.researchgate.net/publications/318889975>; p. 6, col. 2.

International Search Report for PCT/US2018/050783 dated Dec. 6, 2018; 2 pps.

Written Opinion for PCT/US2018/050783 dated Dec. 6, 2018; 13 pps.

Office Action for U.S. Appl. No. 16/044,464 dated Feb. 4, 2019; 12 pps.

Final Office Action for U.S. Appl. No. 16/044,464 dated Oct. 28, 2019; 14 pps.

Office Action for U.S. Appl. No. 16/044,464 dated May 29, 2020; 15 pps.

Tarun Chitra et al., "Agent-Based Simulations of Blockchain protocols illustrated via Kadena's Chainweb," presented at IEEE European Symposium on Security and Privacy Workshops (EuroS&PW) conference on Jun. 17-19, 2019, 10 pages.

Monica Quantance et al., "Chainweb Protocol Security Calculations," Jan. 2018, 10 pages.

Will Martino et al., "Chainweb: A Proof-of-Work Parallel-Chain Architecture for Massive Throughput," Jan. 2018, 20 pages.

Stuart Popejoy, "Confidentiality in Private Blockchain," Aug. 2016, 10 pages.

Will Martino, "Kadena: The first scalable, high performance private blockchain," Aug. 2016, 9 pages.

Will Martino et al., "The Kadena Public Blockchain: Project Summary Whitepaper," Nov. 2018, 7 pages.

* cited by examiner

| Graph | Full Braid Attack |
|---|---|
| $d \to 3$<br>$\Delta \to 2$<br>$\Omega \to 10$ | $q=0.2, z=1 \to 0.0007896$<br>$q=0.2, z=2 \to 1.398 \times 10^{-6}$<br>$q=0.3, z=1 \to 0.02902$<br>$q=0.3, z=2 \to 0.001889$<br>$q=0.4, z=1 \to 0.2226$<br>$q=0.4, z=2 \to 0.1111$ |
| $d \to 3$<br>$\Delta \to 3$<br>$\Omega \to 20$ | $q=0.2, z=1 \to 1.398 \times 10^{-6}$<br>$q=0.2, z=2 \to 4.234 \times 10^{-12}$<br>$q=0.2, z=3 \to 1.269 \times 10^{-17}$<br>$q=0.3, z=1 \to 0.001889$<br>$q=0.3, z=2 \to 7.726 \times 10^{-6}$<br>$q=0.3, z=3 \to 3.128 \times 10^{-8}$<br>$q=0.4, z=1 \to 0.1111$<br>$q=0.4, z=2 \to 0.02675$<br>$q=0.4, z=3 \to 0.06371$ |
| $d \to 8$<br>$\Delta \to 4$<br>$\Omega \to 1100$ | $q=0.2, z=2 \to 5.629 \times 10^{-609}$<br>$q=0.2, z=3 \to 5.996 \times 10^{-913}$<br>$q=0.2, z=4 \to 6.383 \times 10^{-1217}$<br>$q=0.3, z=2 \to 1.312 \times 10^{-264}$<br>$q=0.3, z=3 \to 2.132 \times 10^{-396}$<br>$q=0.3, z=4 \to 3.466 \times 10^{-528}$<br>$q=0.4, z=2 \to 6.003 \times 10^{-70}$<br>$q=0.4, z=3 \to 2.088 \times 10^{-104}$<br>$q=0.4, z=4 \to 7.26 \times 10^{-139}$ |
| $d \to 4$<br>$\Delta \to 8$<br>$\Omega \to 3243$ | $q=0.2, z=6 \to 4.913 \times 10^{-5378}$<br>$q=0.2, z=7 \to 3.339 \times 10^{-6274}$<br>$q=0.2, z=8 \to 2.269 \times 10^{-7170}$<br>$q=0.3, z=6 \to 2.912 \times 10^{-2332}$<br>$q=0.3, z=7 \to 8.418 \times 10^{-2721}$<br>$q=0.3, z=8 \to 2.434 \times 10^{-3109}$<br>$q=0.4, z=6 \to 1.407 \times 10^{-610}$<br>$q=0.4, z=7 \to 3.605 \times 10^{-712}$<br>$q=0.4, z=8 \to 9.232 \times 10^{-814}$ |

PARALLEL-CHAIN ARCHITECTURE FOR BLOCKCHAIN SYSTEMS

CROSS-REFERENCE TO RELATED APPLICATIONS

The present application claims the benefit of priority of U.S. Provisional Patent Application No. 62/557,314 filed Sep. 12, 2017, entitled "Systems and Methods for Public and Private Blockchain Platforms"; and U.S. Provisional Patent Application No. 62/620,638 filed Jan. 23, 2018, entitled "Systems and Methods for Public and Private Blockchain Platforms." Each of the above-identified applications is hereby incorporated by reference in the present application.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This disclosure relates generally to providing access to information on a decentralized ledger (e.g., on a blockchain), and more specifically, to providing a parallel-chain architecture with improved throughput.

BACKGROUND

Various types of individuals, organizations, and other types of entities (e.g., employers, consumers, financial institutions, retailers, social networking service providers, web-based service providers, etc.) collect and maintain information about electronic transactions. Some prior art solutions rely on distributed ledger systems (e.g., using a blockchain) as a tool for managing and verifying transactions based on cryptographic currencies and other types of digitally-based transactions. Distributed ledger systems based on traditional proof-of-work (PoW) designs suffer from critical limitations in efficiency, slowness, consumption of large amounts of energy, and vastly increased congestion pricing (e.g., via transaction fees). Prior attempts to identify design variants, such as replacing PoW with proof-of-stake (PoS), have their own disadvantages, such as degraded assurance, censorship resistance, the trustless nature of PoW designs. Previous proposals for parallel-chain PoW architectures proposed these architectures for the benefits to security or deployment flexibility or security rather than for scalability. While parallel-chain approaches have been identified in the past as a possible scaling solution, the increased bandwidth usage was seen as a significant problem. Accordingly, there is a need for an improved parallel-chain blockchain architecture to resolve the limitations of PoW architecture.

BRIEF DESCRIPTION OF THE DRAWINGS

An understanding of embodiments described in this disclosure and many of the related advantages may be readily obtained by reference to the following detailed description when considered with the accompanying drawings, of which:

FIG. 7 is a table of results for example base graph configurations of a parallel blockchain network according to some embodiments of the present invention;

DETAILED DESCRIPTION

A. Introduction

Figure 1:
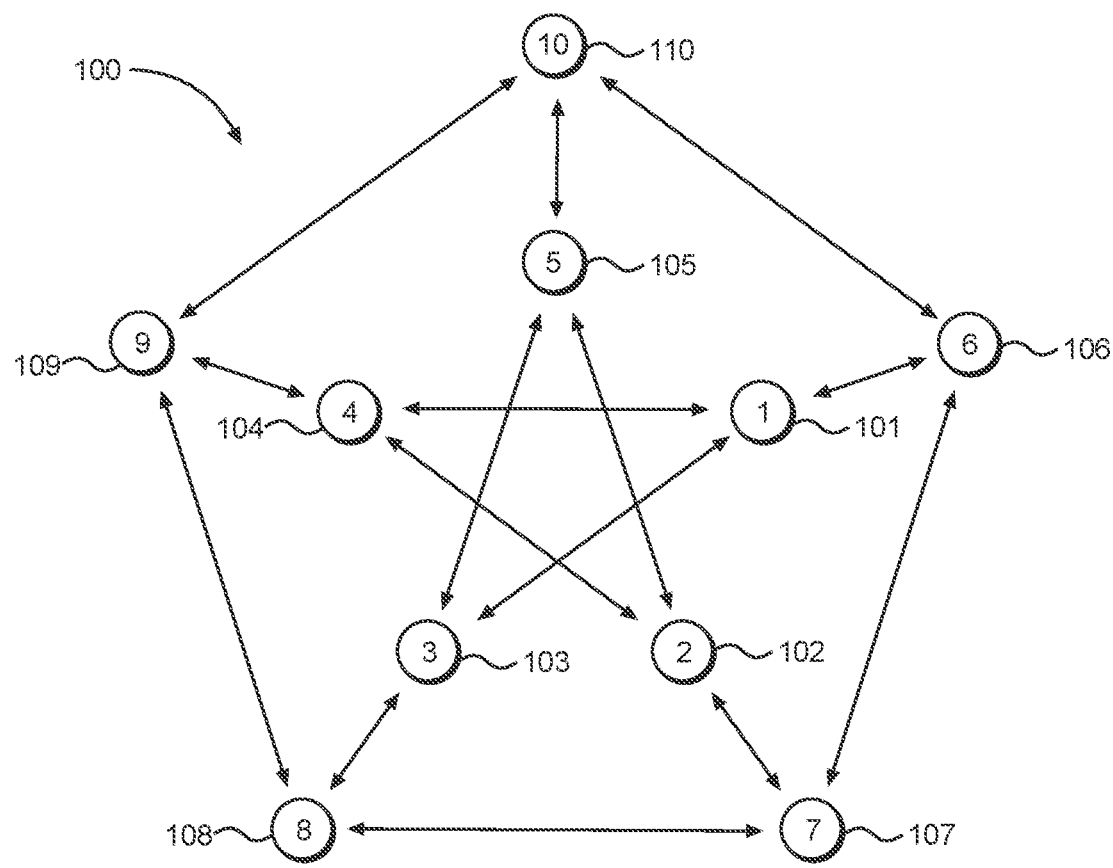
FIG. 1 is a diagram of example peer blockchain relationships in a parallel blockchain network according to some embodiments of the present invention.

In accordance with some embodiments of the present invention, one or more novel computer systems, computer apparatus, computer-implemented methods, computerized articles of manufacture, and/or computer-readable media (e.g., a non-transitory computer-readable memory storing instructions for directing a processor) provide for improvements in the efficiency, reliability, and security of distributed ledger computer systems for a variety of applications.

Inventor(s) for this application have recognized that, in accordance with some embodiments described in this disclosure, various types of individuals, organizations, and other types of entities (e.g., employers, consumers, financial institutions, retailers, social networking service providers, web-based service providers, etc.) may find it beneficial to utilize a parallel-chain PoW architecture that may combine any number, including hundreds or thousands, of individually mined peer blockchains into a single network.

In accordance with embodiments described in this disclosure, deficiencies of existing systems are remedied by providing systems, apparatus, methods, and articles of manufacture for distributed ledger systems enabling a braided network (sometimes referred to as "Chainweb" in this disclosure) capable of achieving throughput in excess of 10,000 transactions per second, a rate which matches and, in some cases, exceeds that of existing fiat-currency networks. According to some embodiments, peer chains incorporate the Merkle roots of each other to enforce a single super chain offering an effective hash power that is the sum of the hashrate of each individual chain.

According to some embodiments, each chain in the network of parallel blockchains mines the same cryptocurrency which can be transferred cross-chain via a trustless, two-step Simple Payment Verification (SPV) at the smart contract level. In addition to massively increasing throughput, the design of the parallel-chain architecture also creates a significant increase in security, thus decreasing the necessary confirmation depth of the network.

According to some embodiments, a parallel-chain architecture blockchain system is configured to provide improved security features.

In some embodiments, for example, specially-programmed code instructions may be generated, stored, and/or replicated across various remotely-situated and cooperative network devices or "nodes." According to some embodiments, the code may include instructions that cause transmission of one or more specialized chain code blocks or "payloads" to a plurality of remote nodes.

In accordance with embodiments herein, deficiencies of existing systems are remedied by providing one or more novel computer systems, computer apparatus, computer-implemented methods, computerized articles of manufacture, and/or computer-readable media for providing as a service referenceable coroutines (e.g., multi-step, oracle-type processes) via a blockchain platform.

In accordance with embodiments, deficiencies of existing systems are remedied by providing one or more novel computer systems, computer apparatus, computer-implemented methods, computerized articles of manufacture, and/or computer-readable media for generation of blocks for a parallel blockchain network by performing one or more of:

determining a maximum blockheight difference for a parallel blockchain network comprising a plurality of blockchains, each blockchain having at least one associated peer blockchain;

determining whether to create a new block for a given blockchain of the plurality of blockchains based on the maximum blockheight difference.

According to some embodiments, determining the maximum blockheight difference may comprise determining a diameter value associated with the parallel blockchain network (e.g., based on an associated graph for the network). In one embodiment, determining whether to create a new block may comprise determining the respective blockheight of every blockchain in the plurality of blockchains. In one or more embodiments, determining whether to create a new block may comprise determining whether adding the new block to the given blockchain would give that blockchain a number of blocks (i.e., a "blockheight" N) that is greater than the maximum blockheight difference away from the number of blocks of all other blockchains.

In one example, a blockchain processing system may be configured so that if a given blockchain in parallel blockchain network is of blockheight N, no other blockchain in the network can be less than N−d blocks in blockheight or more than N+d in blockheight, where d is the maximum blockheight difference. Put another way, according to the preceding example, a blockchain processing system with a blockchain of blockheight N would not allow the generation of a new block for another blockchain that was already of N+d blockheight, because doing so would make that other blockchain more than d blocks ahead of the blockchain of blockheight N, and would violate the example system requirement that all blockchains in the parallel blockchain network be within d blocks of each other.

According to some embodiments, the term "bounded asynchronous advancement" when described as a feature of a parallel blockchain network may refer to a configuration for blockchain processing that includes a requirement that parallel blockchains be bounded in how far apart they can be from each other in terms of blockheight.

In accordance with embodiments, deficiencies of existing systems are remedied by providing one or more novel computer systems, computer apparatus, computer-implemented methods, computerized articles of manufacture, and/or computer-readable media for generation of blocks for a parallel blockchain network by performing one or more of:

storing (e.g., in a memory device of a blockchain processing server), a plurality of parallel blockchains including a blockchain comprising a previously-generated block, wherein the blockchain is associated with at least one peer blockchain;

receiving (e.g., by a transceiver device in communication with the blockchain processing server), a transaction message from a node device;

generating (e.g., by a cryptographic module), a new block hash based on a block header of the previously-generated block and on the corresponding Merkle root for each at least one peer blockchain;

generating a new block header for the blockchain, wherein the new block header comprises the generated new block hash;

generating a new block for the blockchain, wherein the new block includes at least the generated new block header and the transaction message; and/or transmitting (e.g., by the transceiver device), the generated new block to a plurality of node devices associated with the at least one peer blockchain.

In accordance with embodiments herein, deficiencies of existing systems are remedied by providing one or more novel computer systems, computer apparatus, computer-implemented methods, computerized articles of manufacture, and/or computer-readable media for generation of blocks for a parallel blockchain network by performing one or more of:

storing, in a memory device of a blockchain processing server, a plurality of parallel blockchains including an initial set of blockchains, each blockchain comprising an initial set of respective blocks,
        the first block comprising a first block header that includes an initiating block hash,
        wherein each blockchain is associated with at least one peer blockchain;

receiving, by a transceiver device in communication with the blockchain processing server, a transaction message from a node device;

generating, by a cryptographic module of the blockchain processing server, a second block hash based on the first block header of the first block and on the corresponding Merkle root for each at least one peer blockchain;

generating, by a blockchain module of the blockchain processing server, a second block header for the first blockchain,
        wherein the second block header comprises the generated second block hash;

generating, by the blockchain module of the blockchain processing server, a second block for the first blockchain, wherein the second block includes at least the generated second block header and the transaction message; and transmitting, by the transceiver device, the generated second block to one or more node devices associated with the at least one peer blockchain.

storing, in a memory device of a blockchain processing server, a plurality of parallel blockchains including a first blockchain comprising a first block, the first block comprising a first block header that includes a first block hash, wherein the first blockchain is associated with at least one peer blockchain, wherein the first block hash is based on a corresponding Merkle root for each at least one peer blockchain;

receiving, by a transceiver device in communication with the blockchain processing server, a transaction message from a node device;

generating, by a cryptographic module of the blockchain processing server, a second block hash based on the first block header of the first block and on the corresponding Merkle root for each at least one peer blockchain;

generating, by a blockchain module of the blockchain processing server, a second block header for the first blockchain, wherein the second block header comprises the generated second block hash;

generating, by the blockchain module of the blockchain processing server, a second block for the first blockchain, wherein the second block includes at least the generated second block header and the transaction message; and/or transmitting, by the transceiver device, the generated second block to a plurality of node devices associated with the at least one peer blockchain.

In accordance with embodiments herein, deficiencies of existing systems are remedied by providing one or more novel computer systems, computer apparatus, computer-implemented methods, computerized articles of manufacture, and/or computer-readable media for generation of blocks for a parallel blockchain network by performing one or more of:

storing (e.g., in a memory of a processing server) at least one block comprising a blockchain, wherein the at least one block includes a most recently added block, the most recently added block including at least a header and one or more transaction entries;

receiving (e.g., by a receiving device of a processing server) at least one transaction data entry;

generating (e.g., by a hashing module of a processing server) a hash value (e.g., via application of one or more hashing algorithms to at least the header included in the most recently added block);

generating (e.g., by a blockchain module of a processing server) a new block header, wherein the new block header includes the generated hash value and a Merkle root of at least one peer blockchain;

generating (e.g., by a blockchain module of a processing server), a new block, wherein the new block includes at least the generated new block header and the at least one transaction data entry; and transmitting (e.g., by a transmitting device of a processing server) at least the generated new block to a plurality of nodes associated with the at least one peer blockchain.

In accordance with embodiments herein, a system is provided for generation of blocks for a parallel blockchain, the system comprising: a processing device; and a memory device in communication with the processor, the memory device storing computer-readable instructions defining a blockchain management application operable to manage a parallel blockchain network, wherein executing of the computer-readable instructions by the processing device results in performance of one or more of the processes described in this disclosure.

In some embodiments, for example, specially-programmed code instructions may be generated, stored, and/or replicated across various remotely-situated and cooperative network devices or "nodes." According to some embodiments, the code may include instructions that cause transmission of one or more specialized chain code blocks or "payloads" to a plurality of remote nodes.

1. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting.

Some embodiments described in this disclosure may refer to example configurations of a blockchain network having a parallel-chain architecture. For example, a parallel-chain architecture may be comprised of multiple independent peer blockchains (e.g., minting distinct coins of the same currency). Each chain incorporates a subset of other peers' Merkle roots in its own block hashes. A braid configuration is defined by and arranges chains in a manner in accordance with at least one parameter defining interconnectedness of parallel blockchains.

According to some embodiments, a set of parameters defining interconnectedness of parallel blockchains may be represented as a graph such that a given chain samples a fixed number of peer chain Merkle roots for each block (its "degree," or d) but can reach any other chain in some fixed maximum number of hops (the "diameter" of the graph, or $\Delta$). With each increase in blockheight more chains are referenced transitively until with generation of block height equal to $\Delta$ the entire network has been referenced.

While some configurations of blockchain networks are described in this disclosure as being represented by fixed or static graphs, it will be understood, in light of the present disclosure, that embodiments are not limited to any particular parameters for interrelatedness or interconnectedness among blockchains (unless explicitly provided for in a claim). Configurations may be representative of fixed graphs and/or random graphs, and/or static and/or non-static parameters for interconnectedness. In some embodiments that provide for non-static and/or random parameters, the blockchain processing system may define a range of potential or available values that could be selected to define a parallel-chain architecture.

"Ledger" is used in this disclosure to refer to an ordered series of messages that each detail a specific command, action, and/or transaction to take place.

"Byzantine fault tolerant (BFT) consensus" is used in this disclosure to refer to a mechanism allowing a set of nodes to come to agreement about some common truth in spite of a subset of nodes being malicious or faulty.

"Quorum BFT consensus" is used in this disclosure to refer to a consensus protocol in which each node of a blockchain system acts independently to gather a proof message (e.g., public/private key (PPK)-signed evidence) and a threshold number of a plurality of nodes must generate the same proof message before the system commits to a state change. The term "majority BFT consensus" is used in this disclosure to refer to a specific quorum BFT consensus protocol in which a majority consensus of a plurality of permissioned nodes of a blockchain system is required to commit a state change. Quorum BFT consensus protocols, such as Kadena LLC's SCALABLEBFT consensus protocol, use the core feature of a hash chain, in which the incremental hash of transaction #N implies successful replication of all previous transactions (e.g., N−1, N−2, etc.). Additional technical description of the SCALABLEBFT consensus protocol that may be suitable for use in implementing some embodiments of this disclosure is provided in U.S. Provisional Patent Application No. 62/536,053, which is hereby incorporated by reference in this disclosure. In some embodiments, a blockchain system using majority BFT consensus stores transactions in a hash-chain which advantageously allows throughput to not be a function of cluster size. In one example implementation of a majority BFT consensus protocol, a leader node (which may or may not be trusted) adds new transactions to its log, replicates the transaction to the followers (e.g., through an AppendEntry function) and also transmits evidence of its latest log, which includes the log's incremental hash (e.g., AppendEntryResponse (AER)). Each node collects AERs from other nodes, checking hashes against their own respective log. When a node collects a majority of AERs with matching hashes, the node commits the new transactions. The leader node may be configured with the ability to order new transactions (but may have no other special abilities compared to other nodes).

The term "node" is used in this disclosure to refer to a computing device (e.g., a physical and/or virtual machine), such as a server, in a blockchain system.

2. Summary

The inventors in this disclosure describe various solutions for parallel-chain architecture for blockchain networks. The various novel features (and novel combinations of features) provide a platform with security, stability, and throughput performance for facilitating transactions with high assurance (e.g., using smart contracts).

In accordance with some embodiments, smart contracts may be established using programming languages that provide for one or more of the following features: (a) Turing-incompleteness, (b) human-readable code (e.g., stored on the blockchain), (c) safe import of other on-chain contracts, and/or (d) formally verifiable by computers. Although some embodiments may be described in this disclosure are discussed with respect to the PACT programming language of Kadena LLC by way of example of a language having one or more such features, it will be readily understood that embodiments are not limited to PACT or to any other programming language. In accordance with one or more embodiments, the programming language has associated tools and/or other features that facilitate the review of the smart contract's business logic by non-programmers (e.g., by executives and attorneys).

According to some embodiments, novel computer systems, networks, and processes allow for the establishing of cryptocharters through custom, generalized governance mechanisms. Cryptocharters streamline upgrades and data migrations without resorting to hard-forks of the network. In addition, according to some embodiments, a cryptocharter may support the safe interaction between contracts and trusted "off-chain" oracle information sources.

3. Governance

The inventors have recognized that governance has emerged as a major issue in blockchain, with particularly serious implications for the adoption of smart contracts beyond typical crypto-currency applications like token issuance. Various embodiments of the novel blockchain platform described in this disclosure utilize a flexible, programmable solution by which smart contracts can become autonomous yet still governable: a "Cryptocharter."

The inventors have also recognized that prior art solutions are subject to issues of hard fork misuse. Blockchain technology requires client software that runs a protocol that represents the blockchain itself. Like all software, from time to time the protocol must be upgraded. To achieve this, the network undergoes an intentional hard fork wherein the network switches over to a new version of the system. Hard forks are an inherently external event and as such are able to change any aspect of the blockchain itself. They are only restricted by what the community deems appropriate.

The advent of smart contracts has, unfortunately, lead to their misuse. Because hard forks have "god rights" they can be used to resolve contentious community issues concerning the blockchain's entries. At worst, such a hard fork can "split" the blockchain itself wherein dissenters continue to mine the "classic" version. Even for non-controversial changes, the fact that centrality is re-asserted for the purpose of adjusting ledger entries (usually through the authority of community leaders) is not only antithetical to blockchain's trustless ethos but reveals the lack of a mature governance process that is critical to improving the utility of blockchain for high-assurance environments.

With smart contracts like those implemented using the ETHEREUM blockchain platform, the issue becomes more acute, as there is no way to upgrade deployed smart contract code without invoking a centralized authority. Either a contract's owners hold a key endowed with the rights to upgrade to a new version of the contract or, as is the case of "ownerless" contracts like the concept of a decentralized autonomous organization (DAO), the community's leaders need to orchestrate an impromptu, extremely controversial hard fork. Current approaches for ownerless contracts, like Bancor's use of a "pilot phase" where bug bounties are made available and addressed, are half-measures at best. After the pilot phase the contract is made permanently nonupgradeable—a hard fork would be the only way to address an issue post-pilot.

The inventors have recognized that, in accordance with some embodiments, a mature smart contract system should support an ability to receive upgrades to smart contracts for anything at any point in its lifecycle (e.g., from addressing critical issues to effecting strategic enhancements), without requiring a hard fork. One or more embodiments in this disclosure provide for mechanisms within a system to provide governance over the application of upgrades and fixes to the contracts deployed on the blockchain system, without requiring a hard fork. Programming approaches using such mechanisms may be utilized to provide operational security for both private and public blockchain systems.

According to some embodiments, a "keyset" refers to an authentication mechanism that supports multiple keys and a programmable threshold of keys used to sign a transaction. In one example, a programming language with a keyset-based approach provides a centralized solution for validating upgrade transactions.

4. Cryptocharters

For a public chain, various embodiments of this disclosure allow for a generalized mechanism (as opposed to a centralized mechanism suitable for a private enterprise blockchain) that makes possible the expression of arbitrary governance regimes. For example, the generalized mechanism may provide native support of community governance wherein a vote on a particular upgrade or change can be both decided upon and enacted by stakeholders. A "cryptocharter" is a type of smart contract that natively supports arbitrary governance regimes and has a formalized governance mechanism. According to some embodiments, the programming language may require the establishment of a particular governance model. For example, in some versions of the PACT language this is a syntactic requirement; it is not possible to create a smart contract without specifying its governance model. Moreover, with the inclusion of flexible governance, the notion of "distributed autonomous organizations" can reach its full maturity (e.g., allowing it to operate like a business that both functions and is governed according to the details specified by its cryptocharter).

According to some embodiments of this disclosure, a smart contract may or may not be autonomous, but may require a governance mechanism that supports arbitrary models, as discussed above. Contract authors explicitly decide on the contract's governance structure during the contract's construction. The mechanism itself may be expressed as Turing-incomplete code found within the contract.

In one embodiment, the founders of a cryptocharter may specify the governance function at inception as a pass-fail mechanism that, for instance, enacts or validates some kind of voting process, after which the contract can be upgraded. The flexibility means indeed any governance is possible, including but not limited to hard fork governance.

According to some embodiments, when a smart contract is created or upgraded, it can create tables to store data in. In one or more embodiments, each table is owned by one and only one module, with ownerships meaning "raw table access." For example, a contract is said to "guard" its tables as access to them is strictly limited to the access provided by the smart contract's functions. In other words, in accordance with some embodiments, all table access is pursuant to the logic expressed by a contract's functions. Thus, during a contract upgrade, when one has access to the contract itself, one may also perform direct database operations that override the normal "guarding" mechanism that prohibits external code from accessing a charter's database table.

5. Programming Solutions for Smart Contracts

According to some embodiments, the programming language for an application on which a blockchain platform is based may run only in a deterministic environment in which code can only compute on inputs and the accumulated state within the environment. Other blockchain protocols operate in deterministic environments; however, various embodiments of this disclosure utilize a programming language having one or more specialized features and/or combinations of features providing technical improvements in the domain, on both private and public blockchain, that are superior to the current solutions for smart contracts.

According to one embodiment, a blockchain platform is based on a programming language that has one, some, or all of the following characteristics:
a) Turing-incomplete (i.e., not Turing-complete);
b) prohibits recursion (i.e., no function can call itself) or unbound looping;
c) allows inlining (e.g., allows a function call to be replaced with the unchanged function code during compiling);
d) prohibits use of null values in the code module or in data tables;
e) enforces totality;
f) program always logically maps out to a "tree" having one or more terminal points; and/or
g) prohibits jumps to memory addresses.

According to some embodiments, a blockchain platform is based on a programming language having one or more of the following features:
a) Human-readable code; and/or
b) Safe import of other on-chain contracts.

In some embodiments, the programming language comprises human-readable code stored on the blockchain. Human-readable code allows non-technical stakeholders (and programmers) to easily verify on-chain logic.

A human-readable approach to code facilitates the use of name-based resolution for functions and imports. Transactional operations, as discussed in this disclosure, are valid code that call contract functions by name. Smart contracts developed using a language like PACT, for example, can import and use other already-installed smart contracts by name. In accordance with some embodiments of this disclosure, when installed in code, module dependencies are dereferenced and "inlined" by an interpreter (e.g., a PACT interpreter by Kadena LLC) for faster execution. Advantageously, this allows the benefit of rejecting invalid calls at install time.

According to some embodiments, safe import of functions (including other smart contracts) is guaranteed by allowing for users to specify module hashes as part of an import statement, which is enforced by the runtime. Without checks performed at install time to ensure referenced code is correct, "library functions" and other shared code may be unsafe. In contrast, an import functionality in accordance with some embodiments of this disclosure means that on-chain code is available both for code reuse (e.g., utility modules that do not maintain database state) as well as for service provision.

Accordingly, some embodiments of the present invention provide for code that calls an external module function in a manner that is identical in form to a local function call and offers the same level of assurance, including the ability to perform direct, whole-program formal verification that tests the entirety of the code whether it be imported or local. As a result, some embodiments of this disclosure allow for services to be offered on-chain/internally and to customers/externally. Allowing the import of other on-chain contracts, in accordance with some embodiments, improves efficiency and reuse of code and contracts, and facilitates the development of a blockchain-based services architecture. For example, companies may utilize a blockchain platform to offer both data and logic to other organizations and consumers on-chain.

In one or more embodiments, a flexible programming language suitable for certain implementations may provide language support for critical functionality, boosting efficiency, productivity, and simplicity; a powerful key-value database metaphor; public-key authorization primitives; and representation of all datatypes using a native JSON representation.

According to some embodiments, the programming language for developing and executing smart contracts is preferably an interpreted language (i.e., the code submitted to the blockchain is the code that is executed, including any imported code). A key advantage of an interpreter-based approach to compiling (versus code that must be compiled to bytecode before execution, such as code for Ethereum Virtual Machine (EVM)) is the ability to inspect code that is installed on the blockchain. The bytecode required for execution on platforms like EVM is typically too low-level to be human-readable.

6. Formal Verification

PACT is unique amongst smart contract languages in offering a whole program formal verification (FV) solution, which yields an unprecedented assurance of smart contract safety. Formal verification refers to a process by which code is analyzed and transformed to reveal its semantic structure by representing it as a set of mathematical equations. These equations can then be used to prove assertions or theorems about its correct operation. This is radically different than normal software testing, as FV tools can validate correct behavior over infinite input spaces and states, whereas regular programmers can only test for known situations. The nature of FV generally and the implementation of PACT's FV system specifically is discussed is significant depth in the technical details and examples sub-section, with the preceding sections being devoted to a more approachable discussion of FV.

In accordance with some embodiments discussed in this disclosure, a blockchain platform is provided that utilizes a programming solution that allows for the compilation of programming code for formal verification. The compiled code can be directly used by experts to author complex assertions about correct behavior. Turing-incomplete code is advantageous in that it may be more easily compiled for formal verification. In one example, the PACT programming language may be compiled directly to the SMT-LIB2 language, which may be used by formal verification tools such as the Z3 theorem prover5 by Microsoft corporation.

According to some embodiments, FV may be performed "off-chain," before deployment to the blockchain. The module hash mechanism described above ensures deployed code matches the verified codebase. This extends to the entire smart-contract ecosystem, as users of your code will independently verify the intention and assumptions you provide in the documentation. Additionally, some types of languages (e.g., PACT) allow for inlining imported code, allowing users of a developer's code to layer their own assertions in addition to the developer's. A description of PACT and PACT's code-inlining system that may be suitable for use in implementing some embodiments of this disclosure is provided in U.S. Provisional Patent Application No. 62/536,053, which is hereby incorporated by reference in this disclosure. PACT, for example, guarantees that deployed code cannot change, meaning your FV results are valid for the lifetime of that code.

Accordingly, in some embodiments, FV is not "bundled" with on-chain install. While it can seem attractive to "bundle" FV with on-chain install, failing the install if assertions are disproven, it is unnecessary, thanks to module hashes, and inappropriate for blockchain execution. A formal verification process such as the Z3 process may be relatively fast for its domain, but is very CPU-intensive and can easily take minutes/hours depending on the complexity of the assertions. Accordingly, FV, as well as any other unit or regression testing, preferably occurs before deployment, and then enjoys the stability of inlined code once deployed on the chain. According to some alternative embodiments, FV may occur with on-chain install, if deemed desirable for a particular implementation.

7. Pact-Based Smart Contracts

The term "pacts" will be used in this disclosure to refer to coroutines to orchestrate asynchronous sequential execution for confidential "blinded" transactions. According to some embodiments of this disclosure, pacts make the automation of oracle interactions easy and safe by allowing users to structure atomic, multi-step, call and response interactions. With pacts, a single function can yield and resume at distinct "steps" which provides a form of automated multi-phase commit. If steps fail, rollbacks are specified to reverse changes post-failure. Accordingly, various embodiments of this disclosure may comprise execution environments that support atomic transactions at the per-transaction level and/ or for multi-transaction scenarios.

According to some embodiments of this disclosure, pact-based smart contracts comprise three elements: tables, keysets, and a code module. In some embodiments, the data tables are "key-row" and schema-less and support a versioned, columnar history. Keysets for pacts may group a set of public keys with a predicate function to comprise a keyset rule for authorization. Keysets may be defined globally or at a per-row level.

As used in this disclosure, the code module for a smart contract is where all code is declared governing the smart contract. The code module comprises function definitions and "pact" definitions: multi-step functions for confidential execution. The code module accordingly defines the access to and control of its smart contact, including all access to the tables of the smart contract. In this way the code module provides control over the copy of the data table available locally from the chain, in a more secure way than that in which an API may provide access to and control of data on a remote server.

According to some embodiments, contract operations are executed by sending in one or more module function calls. A given blockchain message preferably comprises a single transaction in the database sense of atomic execution: if any failure occurs, the entire operation is rolled back to the state before the function was executed.

According to some embodiments, the querying of contract data is configured for data export (e.g., as opposed to heavy analytical processing). For example, the inventors have recognized that performance may be optimized by having queries executed in a blockchain's "local mode"; most historical queries take a transaction identifier that guarantees the validity of the data up until that transaction identifier in the blockchain.

According to various embodiments of the present invention, the code of a smart contract resembles in some ways stored procedures in that they are deployed into the blockchain, exposing functions that house the detailed transaction logic. Transactions are executed by sending in pieces of code that call exposed functions with appropriate argument values. In a pact-based system, one or more tables may be guarded by its associated code module, preventing direct access to the table, and allowing the code module to define safe and stable access to the table.

As noted above, in accordance with some embodiments, a blockchain system is provided that allows for atomic execution of smart contracts in which updates are committed only upon successful completion of the entire code path, avoiding errors associated with memory address jumps and/or recursive code logic.

According to some embodiments, in order to define a table for a smart contract, a module must also be defined to govern access to the table. Direct access to the table may be limited to administrators if desired and secured by the module's administrative keyset. In some embodiments, code declared within a module may have unlimited access to the table.

With the code module governing access to the table in a smart contract, access to the table can only occur by calling module functions. In some embodiments, contract authors may use specific keysets to provide desired user-level authorization schemes. Administrative access may be defined in order to allow for data migration and/or emergency procedures.

According to some embodiments, a blockchain system may be configured for use with one or more public-key signing schemes (e.g., like that of Bitcoin™) in which incoming transactions are signed with a provided public key (or keys). According to some embodiments of a blockchain system, before executing any code the execution environment runtime first verifies all signatures (e.g., aborting a transaction on a verification failure). If all signatures are verified, the execution environment may be populated with any verified keys. Executed code can then match verified keys against one or more predefined rules (a "keyset") that combine a defined set of public keys with a keyset predicate function. In some embodiments, the keyset predicate function may specify logic determining how transaction keys may match against the keyset, for example: one match only, match all, match a majority, etc.

As discussed above, a pact defines a function comprising a plurality of defined steps to be executed by different entities as sequential transactions on the blockchain. According to some embodiments, a pact can yield and resume at key points in a single function execution. An example execution of a pact-based smart contract for an example payment transfer involving functions that can yield and resume is described in U.S. Provisional Patent Application No. 62/536,053, which is hereby incorporated by reference in this disclosure.

8. Oracle Processes and Two-Party Escrow

The inventors have recognized that deterministic smart contracts preferably should allow a way to retrieve and authenticate data from the outside world. An "oracle" process is a type of process that typically must execute "off-chain," like obtaining a stock price or running some intensive or indeterminate computation using an API call. The data returned from this type of process is preferably accompanied by some proof of provenance (e.g., a PK signature) to establish the recipient's trust in the obtained data. The inventors have recognized that writing smart contract code to implement standard oracle processes on a blockchain is technically difficult and poorly-understood by the average developer.

According to some embodiments, a programming solution optimized for pact-based smart contracts comprises one or more coroutines to orchestrate asynchronous sequential execution, allowing for the easy and safe automation of oracle functionality using smart contracts.

Some embodiments of this disclosure provide for an advantageous combination of simplified oracle creation with a service-oriented blockchain platform, greatly enhancing the utility and sustainability of smart-contract business on the blockchain.

According to some embodiments for providing oracle functionality, information may be stored securely on the blockchain and guarded by an associated smart contract; the information may be accessed only if the smart contract executes successfully. In this way the on-chain oracle allows for replication of some server functionality that would otherwise be provided by an off-chain oracle process (e.g., using an API call to request the data). According to some embodiments, secured information may be accessed on the blockchain by one entity without another entity having to provide the requested information in response to a request or granting the requesting entity control over the entity hosting the information.

According to some embodiments, one entity maintaining an oracle contract on a blockchain may license the right to execute the oracle contract against the associated information.

According to some embodiments, smart contracts may interact with oracles using either a push-based or a pull-based approach. In a push-based approach, the oracle's external system periodically updates the data in its on-chain representation stores. This data can then be queried (e.g., for a fee or other exchange of value) by another contract.

According to some embodiments, in a pull-based interaction, a smart contract may initiate an off-chain oracle process by requesting external information. In one example, an off-chain oracle process may be structured around pacts, where the first step is the request for external information sent to the oracle and the second step is the user code that consumes the oracle's response.

For a public chain implementation, pact functionality may automate a pull-based oracle process. A requesting contract, for example, may initiate a pull-based oracle process by calling the pact in the same manner as any transactional function call. This executes the first step which performs the necessary setup (e.g., a database read, a payment escrow, etc.). The first step may then yield with a special call (e.g., "yield-ext") that specifies the keyset to validate the oracle response. In one embodiment, the special call may comprise a block height and/or time expiration prior to which the requester cannot force a rollback.

Further according to this example process, an oracle may be notified at this point and may process the request. When ready, the oracle may respond by signing a special resume transaction with the response data and may reference a unique identifier that identifies the original transaction. In accordance with some embodiments, the pact may now resume at the second step, automatically enforcing the previously-specified keyset. The code can now use the provided data with a special binding form (e.g., "resume-ext") and finalize the transaction (e.g., including an escrow fulfillment).

In some embodiments, failures of any sort such as timeout and business rule violations, etc., invoke whatever rollbacks are specified in the first step, such as an escrow refund. Because pact-based operations maintain state over the multi-transactional flow, developers no longer need to program this behavior "from scratch" and are guaranteed that failures will result in the execution of rollback, providing a more secure distributed ledger environment.

The following example code provides an example of a coroutine (a pact) defining a rollback condition for a payment transaction involving a debit from a payor and a corresponding credit to a payee:

```
(defpact pay (payer payer-entity payee payee-entity amount date)
    ; step 1: debit from payer
    (step-with-rollback payer-entity
        (debit payer amount date { "payee": payee })
        ; rollback if step 2 fails
        (credit payer amount date))
    ; step 2: credit to payee
    (step payee-entity
        (credit payee amount date { "payer": payer }))
)
```

In one example, if the defined "step 2" (the crediting of the payment amount to the payee's account) fails, then the defined "step 1" is rolled back by crediting the amount debited from the payer in "step 1."

According to some embodiments, pacts are able to create special-purpose per-pact "pact accounts," which can only be accessed within the code of the executing pact. This allows for secure escrow functionality where the third party may be represented by the state of the chain (likely temporal) itself. In one or more embodiments, during execution, steps of a pact form a region in the call stack where code has the capability to create and interact with pact accounts. As pacts are multi-step affairs with pre-specified actors specified for each step, they allow for the initiator to specify: (a) the logic used for each step, (b) who can step the pact forward at each step, and (c) the logic used to determine if and when they unilaterally trigger a rollback.

In accordance with some embodiments, an "account" associated with a blockchain comprises an entry in a ledger that associates an identity with a representation of a digital asset or item. For example, in some embodiments, a blockchain system would have accounts on a ledger that are in a contract (e.g., a smart contract). Accordingly, in some embodiments, there may not be a top-level or raw account notion (as may be typical top-level item in a cryptocurrency).

The following hypothetical escrow scenario is provided as a metaphor for potential implementations of a two-party escrow using pacts and example transaction rules. In the scenario, Bob wants to buy an apple from Alice for $1. Though Bob and Alice will never see each other and thus cannot make the exchange, they will both see Sam. Bob gives Sam $1 and instructs him in three specific ways: (a) how to verify that the apple is the one that Bob wants, is not rotten, is the correct type, etc.; (b) if the apple provided by Alice fails any criteria defined in (a), do not let Alice try to present the same apple again, cancel the transaction, and return Bob's money; and (c) if Alice does not provide the apple within a predefined time period (e.g., 24 hours), then Bob may unilaterally cancel the transaction at his discretion. A copy of the instructions are sent by Sam to Alice, who can then decide if she wants to hold up her end of the deal before the time runs out.

This is effectively how two-party escrows via pacts work, with the exception that Sam is the blockchain itself. Bob, when constructing the pact, effectively programs Sam's instructions.

Asynchronous pull-based oracles services are particularly interesting when applied to two party escrows. Specifically, they allow for an entire step to be dropped from the cycle. Because of how pacts function, the second step of the pact can execute with the authorizations given to the first step—the initiator of the pact authors it entirely and thus has full control/security regarding what code will be run when the second step takes place. Thus Bob can ask an oracle for a some off-chain data in the first step and, when the oracle responds thus triggering the second step to start, it can continue execution as if Bob signed the trigger transaction without requiring Bob's signature.

According to some embodiments, rollbacks are not automated in that they require a new transaction to be triggered. In one example, from initial request to timeout only two actions can cause a rollback:

a) The second party, which in this case is an oracle, issues the rollback command for the pact in question. This can occur if the oracle service decides not to service the pact though it is more likely that oracle will simply not respond (as some fee will be required to execute the rollback transaction and reclaim the escrow). In that case, the initiator needs to wait for the timeout to pass and issue the rollback themselves to reclaim their escrowed funds.

b) Any step of the pact fails. This can occur if the oracle provides bad/stale data causing the second step to error out. Every transaction has a cost, and the oracle can check that their data will not cause the second step to error ahead of time. Regardless of the reason, when a rollback occurs, the escrow is refunded to the initiator.

Some embodiments of the present disclosure provide a novel blockchain platform system that may comprise only public blockchains, only private blockchains, or both at least one public blockchain and at least one private blockchain.

According to some embodiments, trusted oracle services may be configured to provide (and potentially charge for) access to pull- and/or push-based services for various types of data, including private/confidential information and/or information that is otherwise publicly available.

The inventors have recognized that making data available through a contract in the pure, deterministic context of a blockchain may have value in some types of implementations beyond the value of the data itself. Oracles can provide more than just data; they may act as trusted parties for executing computationally-heavy logic off-chain, or even executing complex Merkle verifications that a light client would rather not have to recalculate themselves.

Because data tables, which in some embodiments may act as a repository for push-based information, are guarded by the contract that owns them (i.e., access to the information is controlled by the contract code), the data itself can be fully public to external actors while also being monetizable for other contracts that wish to access the data themselves (and perhaps take advantage of associated logic).

According to some embodiments, oracles may be implemented in a platform for providing cross blockchain services, providing push-based checkpoint data, and/or pulling the latest chain state on demand. Oracle services in some embodiments may also benefit from the ability to easily migrate from public to appropriately-configured chain settings on a private platform.

B. General Systems, Structures, and Processes

The inventors developed the parallel blockchain architecture described in this disclosure (also referred to as "Chainweb") to solve, among other things, throughput issues of existing PoW systems without sacrificing the trustlessness inherent in the system.

According to some embodiments, assurance via cryptographic hash is fundamentally stronger than assurance rooted in cryptographic signatures. The strength of assurance provided by cryptographic hash is rooted in the physics of processing power limitations, while assurance via cryptographic signatures is based upon the assumption that actors will behave rationally in accordance with game theory, which does not necessarily hold. PoS does provide a mild increase in throughput, but it is still fundamentally bounded by the causally consistent execution speed of the application layer, while the described Chainweb system is not. Though sharded PoS networks have been proposed that may provide significant increases to throughput, these changes move PoS away from a true blockchain architecture towards a system that begins to greatly resemble the existing financial system.

The continued legal functioning of cryptocurrencies is predicated on the probabilistic censorship-resistance of the original PoW design, a feature that PoS designs fundamentally sacrifice by requiring distinct actors to stake funds in order to validate transactions. The exemption of money-transmitter (MTA) regulation to PoW miners (at least in the US) stems directly from the probabilistic nature of confirmation and the lack of distinct rights for a given miner in the system: no single miner can be seen as confirming any transaction, since blocks must accumulate toward some indefinite confirmation depth, and no unique miner has the ability to influence the acceptance of a given transaction over any other.

MTA regulations may eventually be updated to apply to consensus providers, but it will require significant changes. In direct contrast, MTA regulations will easily apply to any staking design that designates distinct parties who participate in the deterministic confirmation of a given transaction. Staking designs may put validators at risk of being subject to money transmitter regulation and enforcement as their unique identity and funds are essential to the effectuation of transfers in the system.

The novel architecture of Chainweb is predicated upon two separate yet related features that operate at distinct layers of the Chainweb stack: 1) cross-chain cryptocurrency transfers via on-chain SPV smart contracts and 2) parallel-chain binding at the hashing level via peer-chain Merkle root inclusion. The former, which occurs in the application (smart contract) layer, leverages the latter to create valid Merkle proofs of currency transfer.

The following description details how to enable globally mass conserving cross-chain transfers of cryptocurrency via SPV. The motivation of such a feature is simple: for Chainweb to function the fundamental currency must be fungible. To do otherwise would result in requiring dedicated exchange markets to move value between individual chains. Cross-chain transfers via SPV securely and trustlessly avoid this necessity.

The following includes a description, in accordance with some embodiments, of a protocol by which parallel chains are bound together to form an example Chainweb network. The protocol itself, while simple, is near-infinitely scalable. The upper-bound on throughput for Chainweb is defined theoretically by existing global IP infrastructure and practically by necessity—while possible, Chainweb configurations with throughputs in excess of 100,000 transactions per second may not be necessary currently.

The Chainweb network is comprised of multiple independent peer blockchains minting distinct coins of the same currency. Each chain incorporates a subset of other peers' Merkle roots in its own block hashes. The capture of foreign roots serves two purposes. First, it allows a given chain to validate that its peer chains are maintaining a consistent fork by locating its own previous Merkle roots in those obtained from its peer chains. Second, it provides a trustless oracle of peer Merkle roots, which is necessary to allow application-layer transfer code to validate provided Merkle proofs to guarantee cross-chain transfers of funds.

The cross-referencing of Merkle roots serves to increase hostile-fork resistance as a function of the number of roots referenced, meaning an attacker must fork all sampled chains simultaneously. Once full coverage is reached, the attacker must fork every chain in the network. Effectively, the hashrate of the network is the sum of the hashrate of each peer, the combined power of which an attacker must overwhelm in order to guarantee acceptance of a fraudulent fork.

The protocol itself consists of three pieces: generation of probabilistic assurance, determining required peer references, and validating peer references. Though Chainweb could use probabilistic assurance from non-PoW mechanisms (e.g. Proof of Space Time) in some embodiments, most of the described embodiments consider PoW. A version of Chainweb could potentially be applied to PoS, but due to the weaker security model of PoS (specifically the ability to cheaply bribe stakeholders), such a version may require additional complicating protocol elements.

Figure 3A:
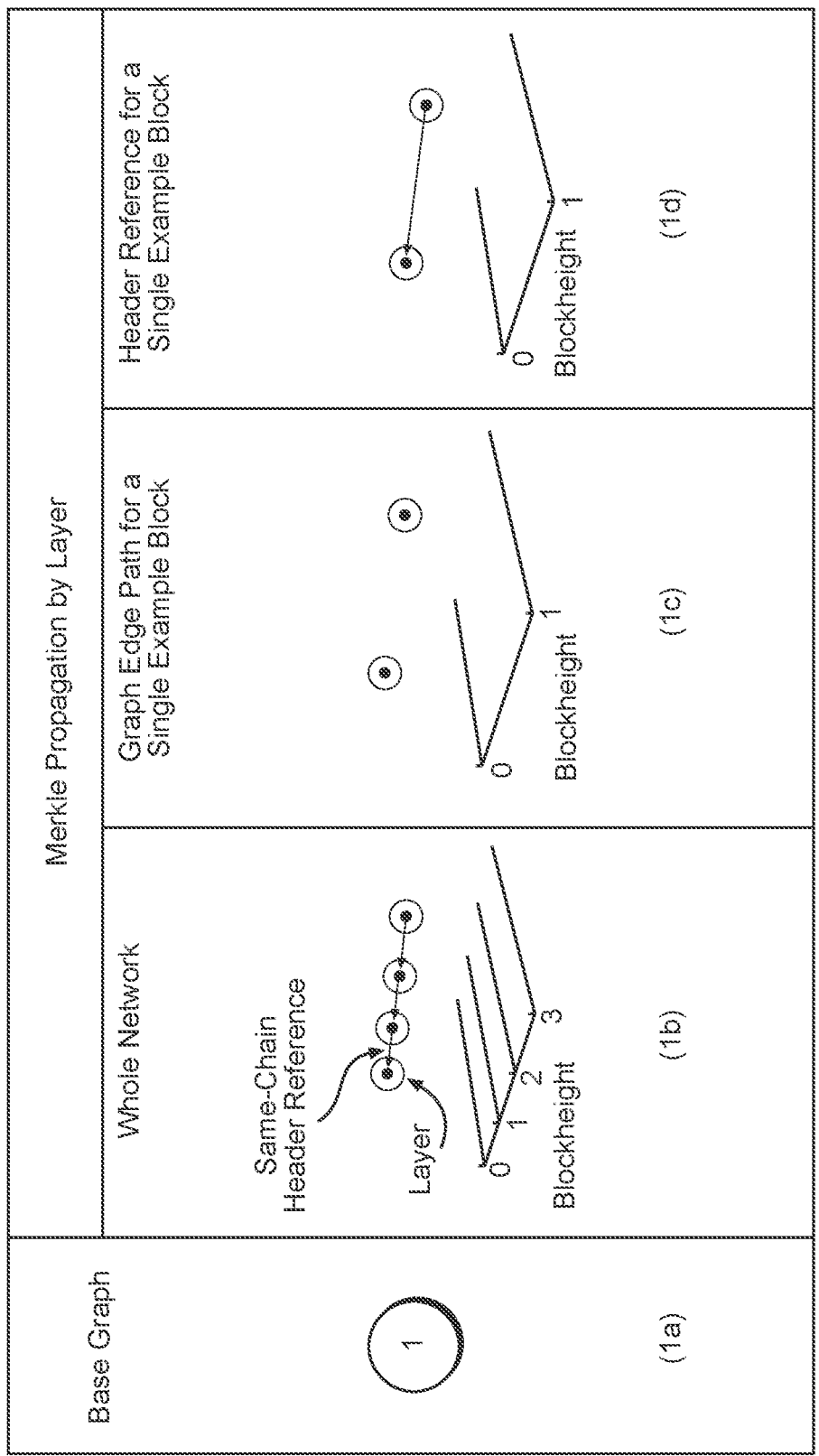
FIGS. 3A, 3B, 3C, 3D, 3E are diagrams of respective configurations of blockchain relationships in example parallel blockchain networks according to some embodiments of the present invention.
Figure 3B:
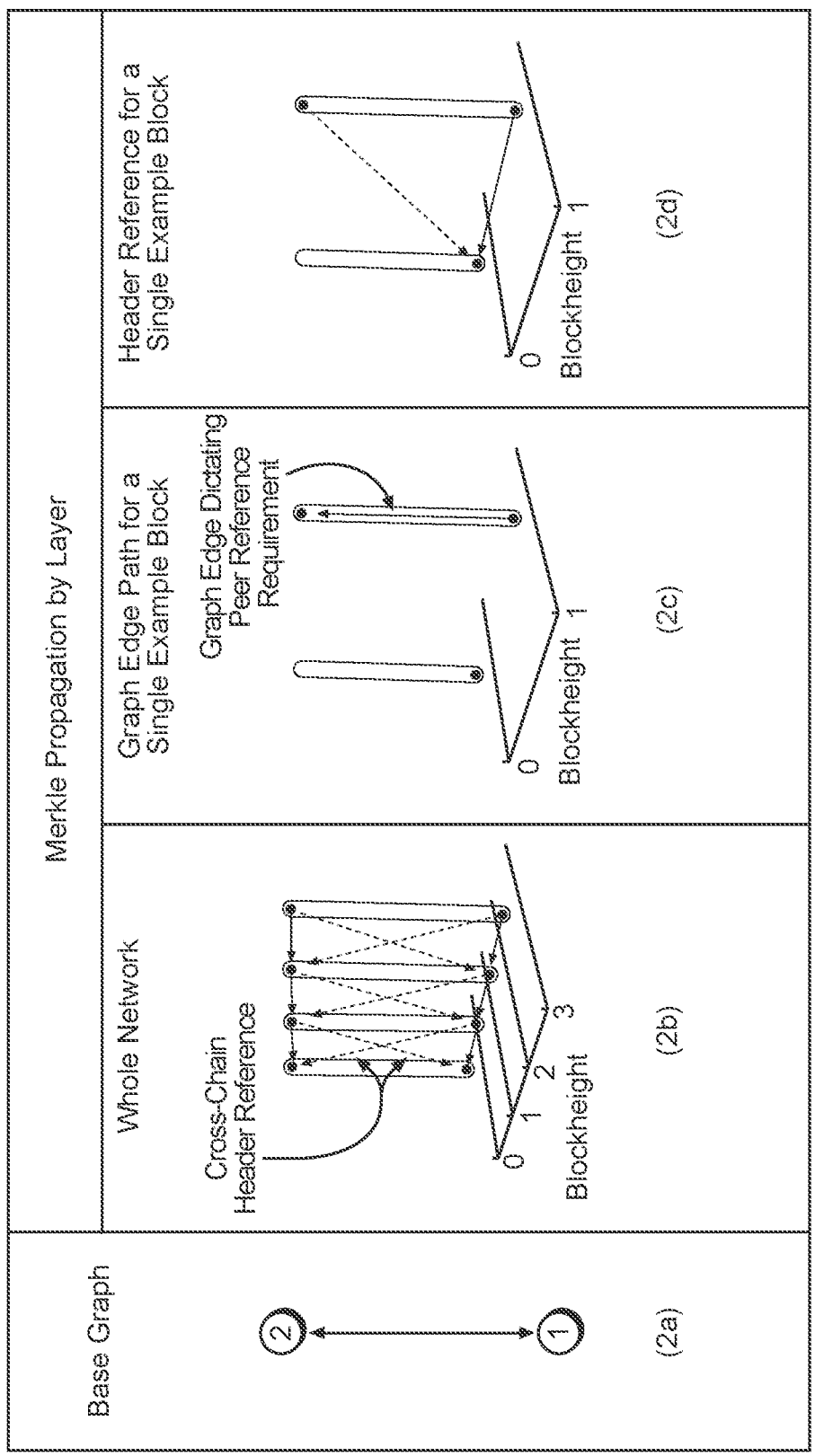
Figure 3C:
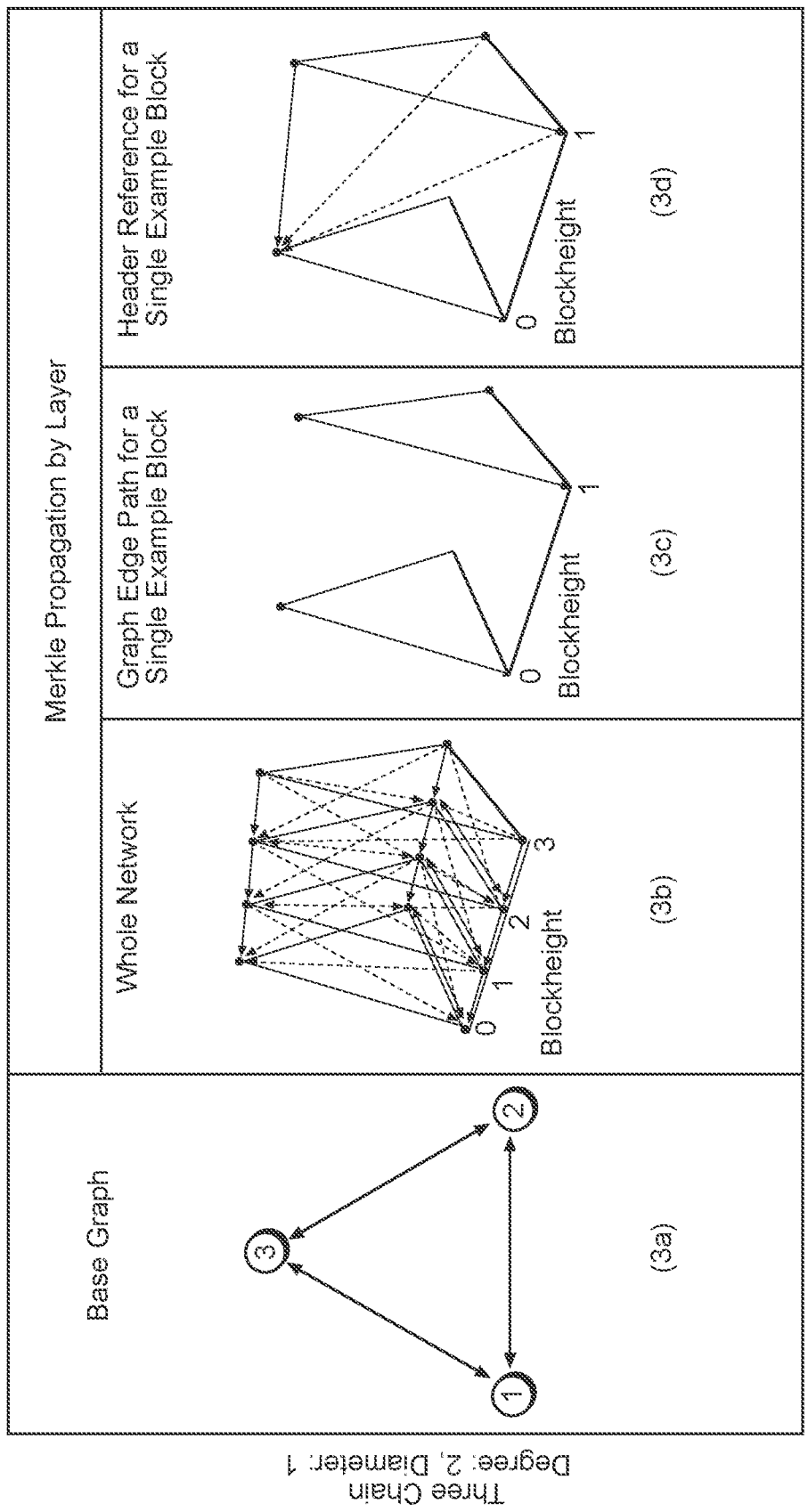
Figure 3D:
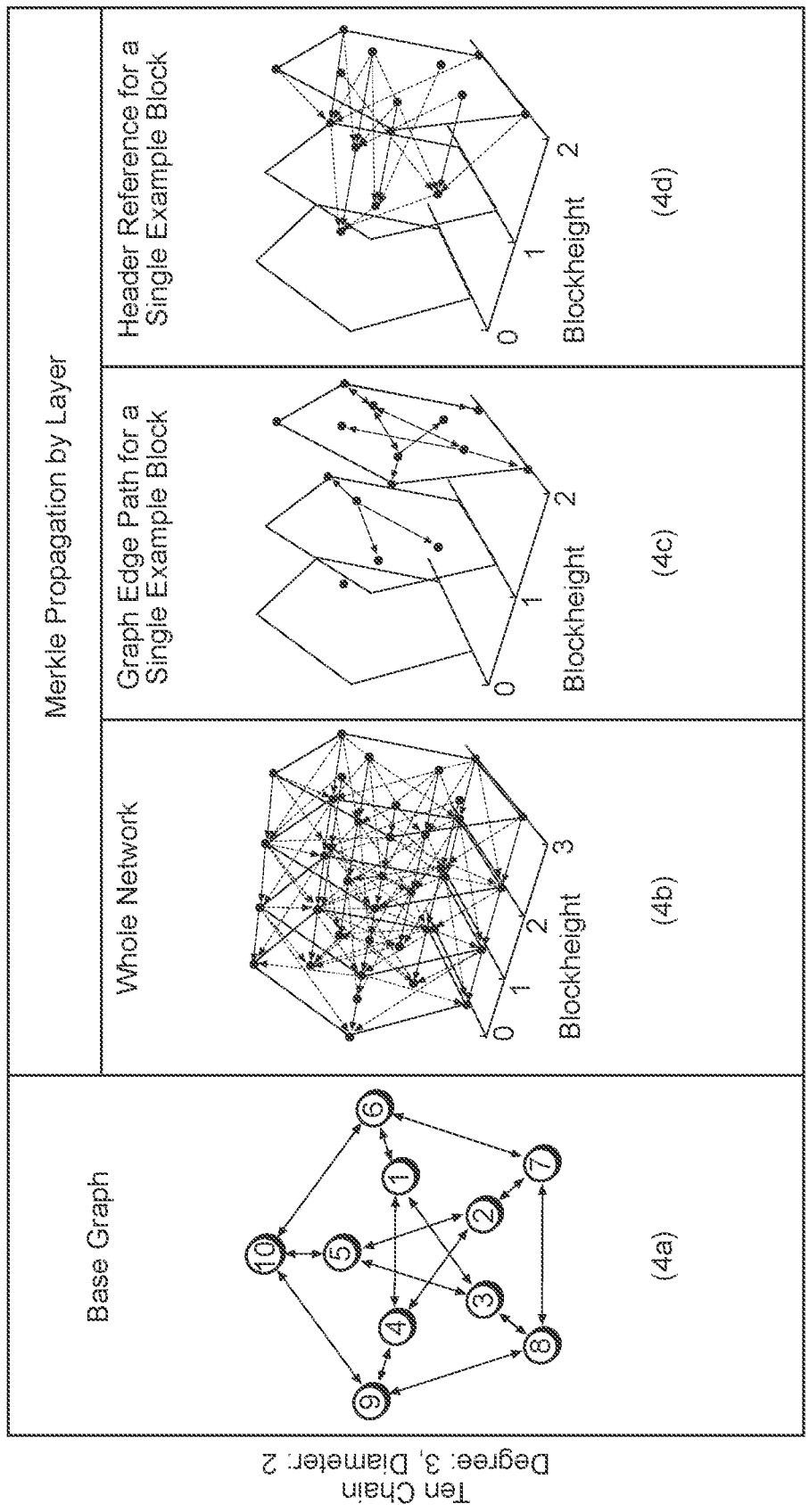
Figure 3E:
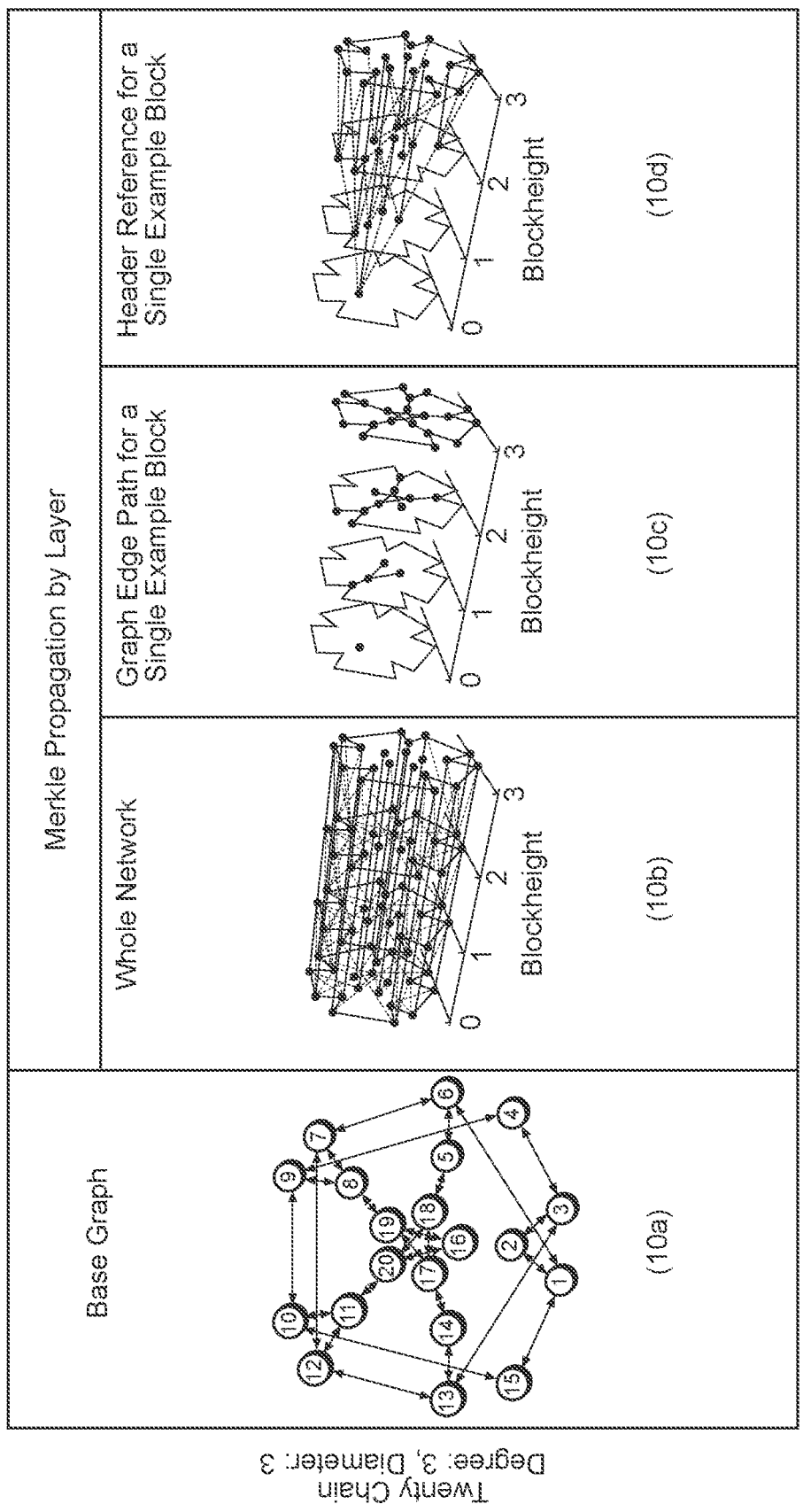

In a traditional blockchain, where there is only one chain, each new block must only reference the header of its previous block. See, for example, the representation of a single-blockchain configuration depicted in FIG. 3A. In Chainweb, each parallel blockchain must additionally reference the headers of other chains (peers) at the same block height as its previous block. The base graph is used to structure the interaction of chains in the web, and can be considered as the instructions for how to combine chains into a braid. A layer is the set of each chain's block at a given block height (the cross-section of the braid). See, for example, the example representations of parallel blockchain configurations depicted in FIGS. 3B, 3C, 3D, and 3E.

As shown in FIGS. 3A-3E, each vertex in the base graph represents a chain in the network. The order of the graph (number of vertices) defines the total chain count while also describing the overall throughput of the network. The degree of the graph defines how many previous headers of peers a given chain must reference, while the edges of a vertex indicate the specific peers for which a given chain must reference the previous block. The diameter of the graph defines the maximum number of inter-chain hops required to construct a Merkle proof between any pair of chains, how many subsequent layers a given block requires to be fully braided and, in terms of block height, the maximum a given chain can advance (or fall behind) any peer in the web.

When a block is processed for any given chain, the peer headers found in that block's header are committed to a storage location available to the smart contract level. In the Kadena Public implementation of Chainweb, for example, this storage location will be a table guarded by a cryptocharter committed at genesis. The available peer headers are part of the consensus level and thus they are trustlessly assured at the smart contract level. Therefore, users can construct a Merkle proof between any two chains that covers, at most, a one less than diameter number of cross-chain hops, as the last hop is available via query in the smart contract layer.

The motivation of Chainweb is to drastically increase the efficiency of PoW by increasing the throughput of the network while keeping the hashrate constant, so in accordance with some embodiments, configurations and related parameters for interconnectedness focus on graphs that are found in the best-known solutions to the Degree-Diameter Problem for Undirected Regular Graphs found in Graph Theory. As these solutions are the largest order graphs for a given degree and diameter, they maximize the throughput of the overall network while minimizing the number of hops required to construct a cross-chain Merkle proof.

Figure 2:
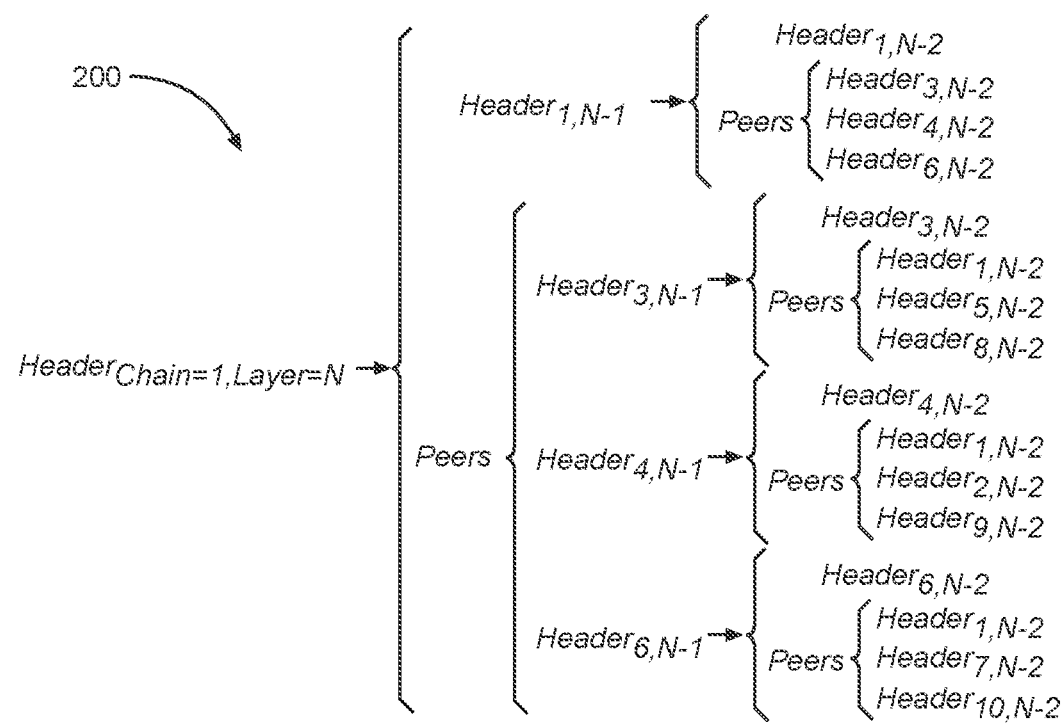
FIG. 2 is a diagram of example peer block header relationships in a parallel blockchain network according to some embodiments of the present invention.

Using the Petersen graph 100 in FIG. 1 as the base graph and taking the example block of (Chain 1, Layer N) as a starting point, header references 200 for previous layers may be defined as depicted in FIG. 2. The example Petersen graph 100 of FIG. 1 is of order 10, degree 3, and diameter 2. Each vertex 101, 102, 103, 104, 105, 106, 107, 108, 109, 110 represents a respective one of chains 1-10 in the network. Vertex 101 (chain 1) is associated with peer blockchains 3, 4, and 6.

Using these references, one can construct a Merkle proof which the SPV system can directly validate for any transaction in the network that has occurred in layer<=N−2. This process doubles as a mechanism to near-exponentially increase cryptographic assurance.

This process quickly becomes difficult to represent without the use of three-dimensional graphics. As such, FIGS. 3A, 3B, 3C, 3D, and 3E provide visualizations of the base graphs (1a, 2a, 3a, 4a, 10a), full braids (1b, 2b, 3b, 4b, 10b), and the forward propagation of Merkle roots across subsequent layers (1c-d, 2c-d, 3c-d, 4c-d, 10c-d) for the four smallest-possible Chainweb configurations. However, the Chainweb protocol is fully general for, at the very least, all undirected, regular base graphs.

Beyond the peer references dictated by the base graph, Chainweb must guarantee that, to replace any given block in the network, all blocks that currently exist within the future Merkle cone of that block must be replaced. This feature is required to ensure that Chainweb network cross-chain transfers conserve cryptocurrency mass. Two example peer header rules, each of which dictates how two header reference paths for a pair of neighboring chains must terminate as the same header, enforce the same history requirement.

Figure 4:
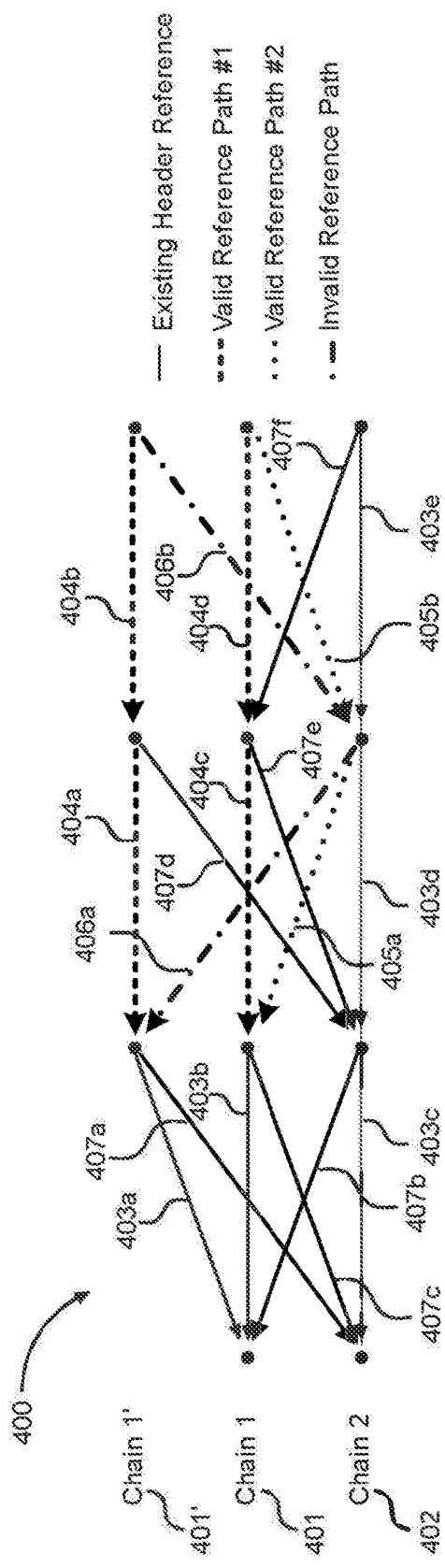
FIG. 4 is a diagram of an example peer reference protocol requirement in a parallel blockchain network according to some embodiments of the present invention.

An example Same Chain Rule, represented in graph 400 of FIG. 4, requires that the header of a chain and the headers of referenced peers agree on the ancestry of the header of the chain. FIG. 4 shows Chain 1 401, Chain 2 402, and Chain 1' 401', existing header references 403a-e and 407a-f, valid reference paths 404a-d, valid reference paths 405a-b, and invalid reference paths 406a-b.

Figure 5:
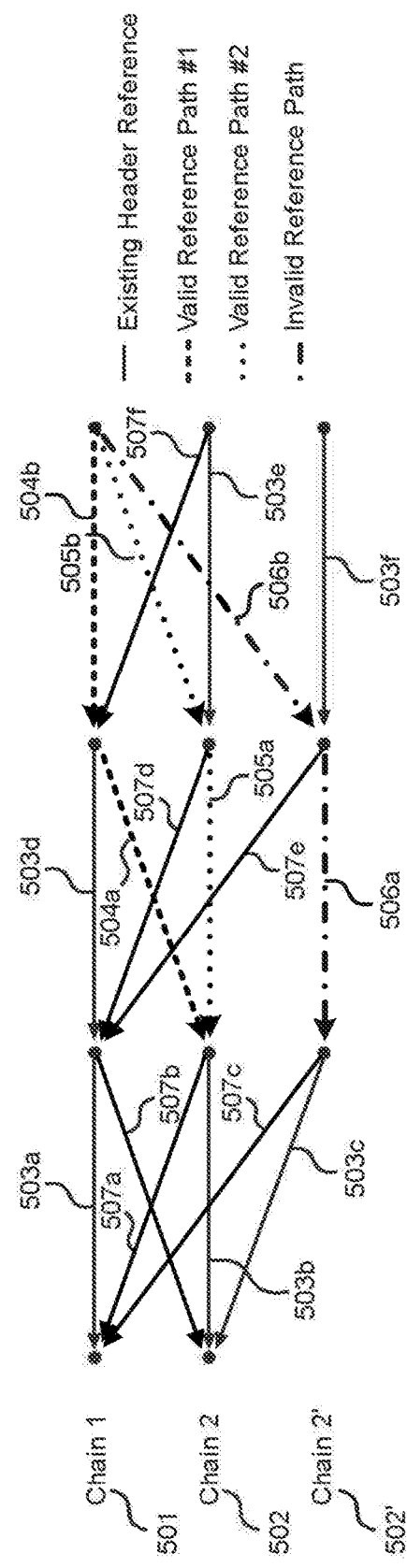
FIG. 5 is a diagram of an example peer reference protocol requirement in a parallel blockchain network according to some embodiments of the present invention.

An example Same Peer Rule, represented in graph 500 of FIG. 5, requires that the header and the headers of referenced peers agree on the ancestry of the referenced peer. FIG. 5 shows Chain 1 501, Chain 2 502, and Chain 2' 502', existing header references 503a-f and 507a-f, valid reference paths 504a-b, valid reference paths 505a-b, and invalid reference paths 506a-b.

According to some embodiments, these rules are applied to every peer reference found in any given header, with failure in any rule creating an invalid block header. Thus, to replace a given block in the network one must replace every block that directly or indirectly references that block.

Figure 6:
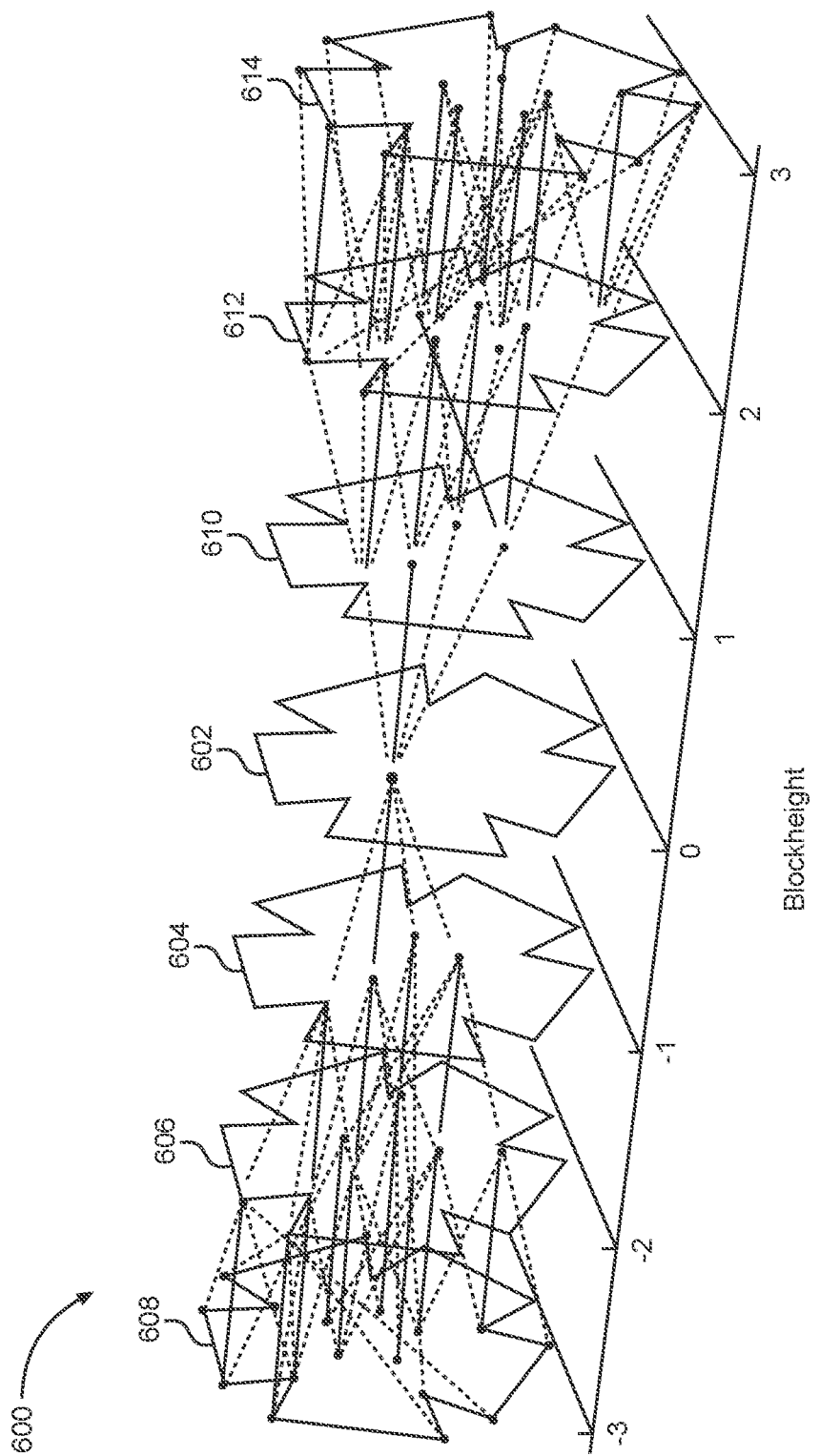
FIG. 6 is a diagram of a configuration of past and future Merkle cones in an example parallel blockchain network according to some embodiments of the present invention.

For any given block, the reference propagation structure is defined by the Merkle cone of that block; the past Merkle cone describes what past peer transactions are trustlessly provable at a given point and the future Merkle cone describes how a given transaction becomes trustlessly provable to the entire network as subsequent layers are formed. Any transactions that fall outside of the Merkle cone of a block are unprovable via direct Merkle validation proof (e.g., SPV). FIG. 6 is a diagram of a representation of past and future Merkle cones in an example parallel blockchain configuration. Specifically, the representation 600 depicts past and future Merkle cones defined using graphs 604, 606, 608, 610, 612, and 614 for various respective blockheights, with respect to graph 602 for blockheight 0, in a twenty-chain network.

Merkle cones are a fundamental feature of Chainweb with wide-ranging implications, chiefly that they are the bridge between the diameter of the graph and the confirmation latency of a given Chainweb configuration. This is due to the relationship of three features: the future Merkle cone of a given block that directly defines what a double-spend attacker must mine to replace that block, the diameter of the graph that defines the length of the cone, and the configuration of the base graph that defines the mass of the cone.

As every layer has a probability mass, so too do Merkle Cones. Known as Merkle Mass (or $\mu_2$ for short), it is the sum of the mass of the sequential layer intersections of the cone and it increases at a nearly exponential rate as the future Merkle cone of a block is being constructed by the network. This measure dominates the security model of any Chainweb configuration since an attacker must overwhelm the full mass to double spend successfully.

A non-fully-propagated (partially-constructed) future Merkle cone also casts a shadow on the next layer. The shadow consists of the peer headers that can be constructed for that layer solely based on the headers found in the partially constructed cone. The size of the shadow is important from an attacker perspective as it dictates how far ahead they can potentially work in private without needing to wait for the honest network to catch up and provide the requisite peer headers; in such an instance where the lack of peer headers stall a double-spend attacker, a more detailed strategy is required as it is optimal for an attacker to participate in honest mining dedicated to the peer headers they require to continue their double-spend attack.

Layers are formed by the mining of individual chains wherein each chain, being a peer, has the same difficulty level. Difficulties are adjusted from a whole-network perspective and are enacted at a given layer height. The chance that a miner could find duplicate solutions, only one of which can be used, for the same block at nearly the same time is non-zero and thus a strategy that maximizes the expected return of mining is needed. Therefore, on average each chain receives the same fraction of total network hashrate, as this allocation is the equilibrium of individual miners selfishly attempting to minimize their mining collisions and thus waste.

Mining a chain is a stochastic process that depends on the progress of its peers and thus, from time to time, the production of the next block in a given chain will stall. In such an instant, the global hashrate naturally pools toward that chain, increasing its speed of advancement and allowing it to catch up. This pooling occurs because the peer chains that reference the stalled bock are unable to advance without said block to reference. These peer stalled blocks begin to stall subsequent blocks, all found in the next layer of the cone of said block, and so on. The absent block carves out a hole in the braid where its future Merkle cone should be. As the stall continues, fewer and fewer blocks are able to be mined and, should the problem persist for long enough, the stalled block will be the only minable block in the entire network.

Using the Petersen base graph example, if a given chain should fall two blocks (the diameter) behind its peers, no other chains can be mined and the entirety of the network's hashrate is thus forced to be applied to chain 1, which increases the average rate of mining success by 10× for the current block. Once that block is found and the stalled chain is now only 1 block behind, only chains 2 (1; 3; 4; 6) are minable, resulting in an initial 2.5× increase in the rate of mining success which decreases to 1× (average) as those solutions are found.

Therefore, it is in the best interests of any miner to allocate mining resources at a per-chain level in a manner that keeps the rate of new block production for every chain as even as possible. This strategy is purely selfish, as the existence of a lagging chain decreases their own expected return.

The full proofs of several closed-form probability analyses for double-spend attacks, which fall in line with the tradition of the Nakamoto analysis, can be found in U.S. Provisional Patent Application No. 62/620,638 filed Jan. 23, 2018, entitled "Systems and Methods for Public and Private Blockchain Platforms," at pages 32-41, which subject matter is incorporated herein by reference.

The Chainweb network is comprised of multiple independent peer blockchains minting distinct coins of the same currency. Each chain incorporates a subset of other peers' Merkle roots in its own block hashes. A Chainweb braid arranges chains in a graph configuration such that a given chain samples a fixed number of peer chain Merkle roots for each block (its degree, or but can reach any other chain in some fixed maximum number of hops (the diameter of the graph, or $\Delta$).

With each increase in block height more chains are referenced transitively until with generation of block height equal to $\Delta$ the entire network has been referenced. Solutions to the degree-diameter problem define valid graph configurations for a Chainweb braid (such as the Peterson graph) where the desired degree and diameter determine the size of the network (the order or $\Omega$).

A prudent recipient of coin will wait until at least $\tilde{z}$ block height has been added to a chain before accepting confirmation of a transaction in a given block. For a single chain this practice results in generation of $\tilde{z}$ blocks; for a Chainweb braid this practice will result in the network generating a number of blocks equal to $\Omega \cdot \tilde{z}$ blocks, or a layer of the braid for every increase in block height.

Our analysis will consider three scenarios, each one a tighter bound on the probability associated with the strategy of the adversary. The first scenario is one in which an adversary attempts to recreate the entire braid in parallel to the network. The second scenario describes the adversary creating only the blocks that directly reference the block that contains her fraudulent transaction, or the Merkle cone (defined below) of her fraudulent block, for arbitrarily large values of $\tilde{z}$. The final scenario describes the case in which an adversary generates the Merkle cone of her fraudulent block for a value of $\tilde{z}$ equal to $\Delta$, the diameter of the graph.

First, we consider the scenario of an adversary trying to generate an entire alternate fork of the Chainweb, or braid, faster than the honest network. For every increase in block height, the number of blocks generated across a Chainweb is equal to the mass $\mu$, of a layer, which for the full braid is the order $\Omega$. As in the Bitcoin analysis, a receiver will wait until the transaction in question has been added to a block and $\tilde{z}$ blocks have been linked after it. In the Chainweb case waiting $\tilde{z}$ additional blocks is equivalent to waiting for full layers of the Chainweb to be generated, or $\Omega \cdot \tilde{z}$ blocks, which in the case of full-braid replacement must also be generated by the adversary.

The general probability an adversary catches up with an honest chain or chains is:

$$q_{\mu(z)} = \begin{cases} 1 & p \leq q \\ (q/p)^{\mu(z)} & p > q \end{cases},$$

where
p=probability an honest node finds the next block
q=probability the adversary finds the next block
$q_{\mu(\tilde{z})}$=probability the attacker will ever catch up from $\mu(\tilde{z})$ blocks, i.e. $\tilde{z}$ layers, behind.

Where the adversary contains less than 51 percent of the network hash power, $$q_{\mu(z)} = (q/p)^{\mu(z)}$$

Assuming the honest blocks took the average expected time per block, the attacker's potential progress will be a Poisson distribution with expected value:

$$\lambda = \frac{q}{p} \mu(z).$$

To get the probability the attacker could still catch up now, we multiply the Poisson density for each amount of progress she could have made by the probability she could catch up from that point:

$$\sum_{b=0}^{\mu(z)} \frac{\lambda^b e^{-\lambda}}{b!} \cdot \left(\frac{q}{p}\right)^{\mu(z)-b}.$$

For Scenario 2 we examine the probability of a successful double-spend attack for an adversary attempting to generate a particular referential sub-section of the braid called a Merkle cone for arbitrarily large values of $\tilde{z}$. For this analysis, therefore, we must define the term "Merkle cone."

Given the referential property of Chainweb, for an adversary to successfully replace a block in the braid she must not only generate subsequent blocks on her own chain but also generate blocks on sibling chains that reference the bad block. If the fraudulent block is generated at block height l=0, then at block height l=1 there are d+1 blocks containing a hash of the Merkle root of the fraudulent block which form a referential layer.

It follows that the expansion ratio of the space that references the Merkle root of the fraudulent block can be represented by the set of vertices of a bounded d-regular expander graph with each moment of expansion expressed in terms of block height. The vertex space of our expansion graph here is finite and bounded by the size of the braid $\Omega$.

This expanding set of referential blocks begins at the fraudulent block and grows over time until it reaches the entire network after $\Delta$ number of layers. The space created by the expanding layers that reference the Merkle root of the fraudulent block defines a cone-shaped subsection of the full network braid, which we define as a Merkle cone.

The number of blocks in any given Merkle cone layer l is represented by $\sigma(l)$. The number of referential blocks from inception to the current layer l is the Merkle mass, or $\mu_2$. Therefore, a fully-propagated Merkle cone has a mass of $\mu_2(\Delta)$ blocks. For an adversary's alternate Chainweb to be accepted, she must offer at least a fully-propagated Merkle cone as an alternative to the network, but for this analysis she must continue to generate layers for an arbitrarily large value of $\tilde{z}$.

For l≥Δ the adversary must mine a layer of size Ω, since every chain contains a reference to the fraudulent Merkle root. For l>Δ, the adversary mines a Merkle cone that is a subspace of the entire braid, and the proportion of the network mining the same space as the adversary is equivalent to the proportion of the network encompassed by the Merkle cone. Therefore, the probability for the adversary and the network of mining a given block in the Merkle cone layer l is as follows:

$r_p$=resources available to the honest network $r_q$=resources available to the adversary $r_p+r_q=1$ $$\begin{bmatrix} \text{adversary:} & q = r_q \\ \text{network:} & p = r_p \dfrac{\sigma(l)}{\Omega} \end{bmatrix}.$$

As an aside, we note that in practical application an adversary must wait for the header blocks on peer chains to become available before proceeding on to further layers. Therefore we have given the adversary a theoretical advantage in this proof by assuming that headers are always available to the adversary when they become necessary for future progress.

Clearly there are limitations from a practical perspective in waiting an arbitrarily large block height before accepting a transaction as having a high likelihood of confirmation. This section presents the case in which the recipient waits Δ layers such that the adversary must generate only a Merkle cone of $\mu_2(A)$ to offer a viable replacement.

To begin, we then substitute the resource availability functions in for the expected value function:

$$\lambda = \frac{r_q}{r_p \dfrac{\sigma(l)}{\Omega}} \mu_2(z).$$

Given that 1) the subset of blocks the adversary must mine and 2) the proportion of resources the network allocates to the Merkle cone both change with the layer in question, the probability distribution modeling the progress of an adversary is a composite discontinuous function of individual Poisson point processes.

For an adversary to catch up to the network if she is mining the first layer, she must successfully finish her current layer as well as all subsequent layers until she completes layer $\tilde{z}$. Therefore, the probability of an adversary successfully catching up is:

the probability she is at a particular block•the Poisson point process of completing the current layer•the Poisson point process of completing every subsequent layer, inclusive of $\tilde{z}$.

Aggregating over all layers l in the Merkle cone gives us the following final composite function modeling the adversary's likelihood of catching up from any given block b in the cone, times the probability of being in that block:

$$\sum_{l=0}^{2}\left[\sum_{b=0}^{n(l)} \frac{\lambda(l)^b e^{-\lambda(l)}}{b!} \cdot \left(\frac{r_q}{r_p \dfrac{\sigma(l)}{\Omega}}\right)^{\mu_2(z)-b} \cdot \prod_{j=l+1}^{2} \frac{\lambda(j)^{\sigma(j)} e^{-\lambda(j)}}{\sigma(j)!}\right]$$

Even when restricting the security analysis to undirected, regular base graphs, the addition of graph theory structures such as degree, diameter, and order have profound implications for the security model of the network. The future Merkle cone bridges the domains of graph theory and PoW, the solution to which captures the number of blocks an attacker must mine to replace her fraudulent block in the network. As the layer depth of a given block increases, the peer headers required increase at a nearly exponential rate until a layer depth equivalent to the diameter is reached, after which the required headers increase linearly.

The Chainweb structure increases the network security in a similar manner to how orphaned block headers are used in Ghost or Decor+ protocols, though the inclusion in Chainweb occurs at a much faster rate while simultaneously increasing network throughput. Much like in a traditional blockchain where a malicious fork must be mined sequentially, an attacker in a Chainweb network must mine the peers found in subsequent layers that fall in a block's future Merkle cone in a sequential fashion.

For the purposes of this disclosure, the probability of an attacker working in private being able to construct the future Merkle cone of a given block at or before full propagation is described as follows in U.S. Provisional Patent Application No. 62/620,638 filed Jan. 23, 2018, entitled "Systems and Methods for Public and Private Blockchain Platforms":

$$\sum_{l=0}^{z}\left[\sum_{b=0}^{\sigma(l)} \frac{\lambda(l)^b e^{-\lambda(l)}}{b!} \cdot \left(\frac{r_q}{r_p \dfrac{\sigma(l)}{\Omega}}\right)^{\mu_2(z)-b} \cdot \prod_{j=l+1}^{z} \frac{\lambda(j)^{\sigma(j)} e^{-\lambda(j)}}{\sigma(j)!}\right].$$

FIG. 7 describes, in table 700, respective entries 702, 704, 706, 708, each entry including full braid attack results 712 corresponding to respective base graph configurations 710 for values of $\tilde{z} \in (\Delta, \Delta+1, \Delta+2)$.

While the overall network bandwidth increases linearly with the size of the network, into the GB/s range for large base graphs, the two primary classes of data streams that comprise this bandwidth utilization are worthy of individual discussion: Chainweb (whole network) header stream and individual chain block streams.

Block streams, for which there is an individual stream per chain, consist of the header and block for a given chain. The latter comprises the vast majority of bandwidth demands. Luckily, only individuals replicating the entire network need consume all of the block streams and such individuals will already be running a cluster to perform the replication. For larger base graphs, it is simply infeasible to replicate each of the chains on a single server.

The full Chainweb header stream is lightweight and fully captures the assurance that Chainweb provides. As such, it is possible for an individual to trustlessly replicate a single chain in the network via its block stream and the header stream.

Figure 8:
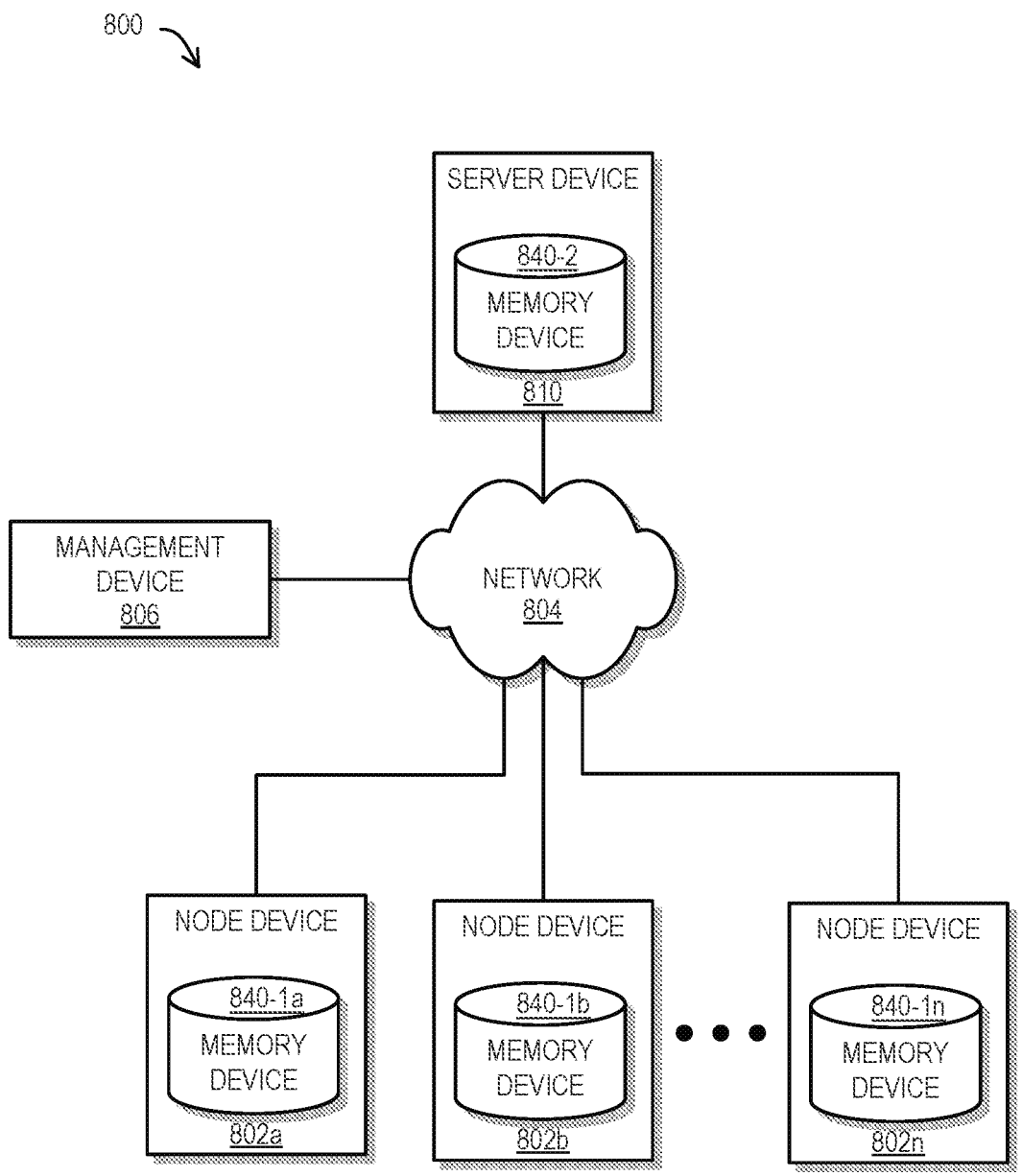
FIG. 8 is a diagram of a system according to some embodiments of the present invention.

Referring first to FIG. 8, a block diagram of a system 800 according to some embodiments is shown. In some embodiments, the system 800 may comprise a plurality of node devices 802a-n, a network 804, a management device 806, and/or a server device 810. According to some embodiments, any or all of the devices 802*a-n*, 806, 810 may comprise and/or be in communication with a data storage and/or memory device 840-1*a-n*, 840-2. Each node device 802*a-n* may comprise a local memory device 840-1*a-n*, for example, and/or the server device 810 may comprise a network memory device 840-2. As depicted in FIG. 8, any or all of the devices 802*a-n*, 806, 810, 840-1*a-n*, 840-2 (or any combinations thereof) may be in communication via the network 804. In some embodiments, communications between and/or within the devices 802*a-n*, 806, 810, 840-1*a-n*, 840-2 of the system 800 may be utilized to provide and manage a distributed ledger. The server device 810 may, for example, interface with one or more of the node devices 802*a-n* and/or the management device 806 to execute multiple instances of specially-programmed smart contracts (not depicted) stored in any or all of the memory devices 840-1*a-n*, 840-2 and/or provide a specially-structured interface via which a user may obtain, verify, execute and/or modify smart contract information.

Fewer or more components 802*a-n*, 804, 806, 810, 840-1*a-n*, 840-2 and/or various configurations of the depicted components 802*a-n*, 804, 806, 810, 840-1*a-n*, 840-2 may be included in the system 800 without deviating from the scope of embodiments described herein. In some embodiments, the components 802*a-n*, 804, 806, 810, 840-1*a-n*, 840-2 may be similar in configuration and/or functionality to similarly named and/or numbered components as described herein. In some embodiments, the system 800 (and/or portion thereof) may comprise a blockchain-based program, system, and/or platform programmed and/or otherwise configured to execute, conduct, and/or facilitate one or more methods described in this disclosure.

The node devices 802*a-n*, in some embodiments, may comprise any types or configurations of computing, mobile electronic, network, user, and/or communication devices that are or become known or practicable. The node devices 802*a-n* may, for example, comprise one or more Personal Computer (PC) devices, computer workstations (e.g., an underwriter workstation), tablet computers, such as an IPAD manufactured by Apple, Inc. of Cupertino, Calif., and/or cellular and/or wireless telephones, such as an IPHONE (also manufactured by Apple, Inc.) or an LG OPTIMUS ZONE 3 smart phone manufactured by LG Electronics, Inc. of San Diego, Calif., and running the ANDROID operating system from Google, Inc. of Mountain View, Calif. In some embodiments, the node devices 802*a-n* may comprise devices owned and/or operated by one or more users. According to some embodiments, the node devices 802*a-n* may communicate with the server device 810 via the network 804 to conduct transactions and/or processes, in accordance with one or more processes as described herein.

In some embodiments, the node devices 802*a-n* may interface with the server device 810 and/or the management device 806 to effectuate communications (direct or indirect) with one or more other node devices 802*a-n* (such communication not explicitly shown in FIG. 8) operated by other users, for example. In some embodiments, the node devices 802*a-n* may interface with the server device 810 to effectuate communications (direct or indirect) with the management device 806 (such communication also not explicitly shown in FIG. 8). In some embodiments, the node devices 802*a-n* and/or the server device 810 may execute separate instances of blockchain algorithm that cause transactions to be managed, distributed, and/or encrypted in a verifiable manner. As described herein, for example, the node devices 802*a-n* and/or the server device 810 may communicate with the management device 806 to execute a cryptographic service utilized to securely disseminate and/or derive consensus for one or more smart contracts with respect to a plurality of the node devices 802*a-n*.

The network 804 may, according to some embodiments, comprise a Local Area Network (LAN; wireless and/or wired), cellular telephone, Bluetooth®, Near Field Communication (NFC), and/or Radio Frequency (RF) network with communication links between the server device 810, the node devices 802*a-n*, the management device 806, and/or the memory devices 840-1*a-n*, 840-2. In some embodiments, the network 804 may comprise direct communications links between any or all of the components 802*a-n*, 806, 810, 840-1*a-n*, 840-2 of the system 800. The node devices 802*a-n* may, for example, be directly interfaced or connected to one or more of the server device 810 and/or the management device 806 via one or more wires, cables, wireless links, and/or other network components, such network components (e.g., communication links) comprising portions of the network 804. In some embodiments, the network 804 may comprise one or many other links or network components other than those depicted in FIG. 8. The node devices 802*a-n* may, for example, be connected to the server device 810 and/or the management device 806 via various cell towers, routers, repeaters, ports, switches, and/or other network components that comprise the Internet and/or a cellular telephone (and/or Public Switched Telephone Network (PSTN)) network, and which comprise portions of the network 804.

While the network 804 is depicted in FIG. 8 as a single object, the network 804 may comprise any number, type, and/or configuration of networks that is or becomes known or practicable. According to some embodiments, the network 804 may comprise a conglomeration of different sub-networks and/or network components interconnected, directly or indirectly, by the components 802*a-n*, 806, 810, 840-1*a-n*, 840-2 of the system 800. The network 804 may comprise one or more cellular telephone networks with communication links between the node devices 802*a-n* and the server device 810, for example, and/or may comprise the Internet, with communication links between the server device 810 and the management device 806 and/or one or more of the memory devices 840-1*a-n*, 840-2, for example.

The management device 806, in some embodiments, may comprise any type or configuration of a computerized processing device, such as a PC, laptop computer, computer server, database system, and/or other electronic device, devices, or any combination thereof. In some embodiments, the management device 806 may be owned and/or operated by a third-party (i.e., an entity different than any entity owning and/or operating either the node devices 802*a-n* or the server device 810; such as certificate, authentication, and/or cryptographic service provider). The management device 806 may, for example, execute one or more web services that provide for centralized blockchain cryptographic functionality. In some embodiments, the management device 806 may receive block chain data from one or more of the node devices 802*a-n* and/or the server device 810, may apply a hash algorithm to the received data, and may transmit the encrypted data to each of the node devices 802*a-n* and the server device 810 (e.g., for storage in local copies of a blockchain-based ledger). According to some embodiments, the management device 806 may comprise a plurality of devices and/or may be associated with a plurality of third-party entities.

According to some embodiments, any one or more of the node devices 802*a-n*, the server device 810, and/or the management device 806 may comprise one or more virtual processors and/or one or more virtual machines, such as those available using virtualization products such as VirtualBox™ by Oracle Corporation. In one example, the management device 806 may comprise a physical CPU assigned to a virtual machine (VM). (A physical CPU allocated to a VM may be referred to in this disclosure as a "virtual processor."). One or more VMs may be utilized in accordance with various embodiments of the present invention.

In some embodiments, the server device 810 may comprise an electronic and/or computerized controller device, such as a computer server communicatively coupled to interface with the node devices 802*a*-*n* and/or the management device 806 (directly and/or indirectly). The server device 810 may, for example, comprise one or more PowerEdge™ R830 rack servers manufactured by Dell, Inc. of Round Rock, Tex. which may include one or more Twelve-Core Intel® Xeon® E5-4640 v4 electronic processing devices. In some embodiments, the server device 810 may comprise a plurality of processing devices specially-programmed to execute and/or conduct processes that are not practicable without the aid of the server device 810.

The server device 810 may, for example, execute one or more coded rules to manage a blockchain ledger for a plurality of smart contracts. According to some embodiments, the server device 810 may be located remote from one or more of the node devices 802*a*-*n* and/or the management device 806. The server device 810 may also or alternatively comprise a plurality of electronic processing devices located at one or more various sites and/or locations.

According to some embodiments, the server device 810 may store and/or execute specially programmed instructions to operate in accordance with embodiments described herein. The server device 810 may, for example, execute one or more programs, modules, and/or routines that facilitate the provision, defining, and/or access to smart contracts, e.g., in an online environment, as utilized in various blockchain applications as described herein.

According to some embodiments, the server device 810 may comprise a computerized processing device, such as a computer server and/or other electronic device to manage and/or facilitate transactions and/or communications regarding the node devices 802*a*-*n*.

In some embodiments, the node devices 802*a*-*n*, the management device 806, and/or the server device 810 may be in communication with the memory devices 840-1*a*-*n*, 840-2. The memory devices 840-1*a*-*n*, 840-2 may comprise, for example, various databases and/or data storage mediums that may store, for example, blockchain instructions, smart contract data and/or other blockchain data, cryptographic keys and/or data, login and/or identity credentials, and/or instructions that cause various devices (e.g., the server device 810, the management device 806, and/or the node devices 802*a*-*n*) to operate in accordance with embodiments described herein.

The memory devices 840-1*a*-*n*, 840-2 may store, for example, blockchain data defining smart contracts such as pacts (defined below) and pact-based oracle processes (described below) data that causes communications with the management device 806 (e.g., an API and/or API tunnel to a web service that provides blockchain authentication, certification, and/or cryptographic hashing). In some embodiments, the memory devices 840-1*a*-*n*, 840-2 may comprise any type, configuration, and/or quantity of data storage devices that are or become known or practicable.

The memory devices 840-1*a*-*n*, 840-2 may, for example, comprise an array of optical and/or solid-state hard drives configured to store ledger data provided by (and/or requested by) the node devices 802*a*-*n*, and/or various operating instructions, drivers, etc.

While the memory devices 840-1*a*-*n*, 840-2 are depicted as stand-alone components of the various node devices 802*a*-*n* and the server 810, the memory devices 840-1*a*-*n*, 840-2 may comprise multiple components. In some embodiments, multi-component memory devices 840-1*a*-*n*, 840-2 may be distributed across various devices and/or may comprise remotely dispersed components. Any or all of the node devices 802*a*-*n*, the management device 806, and/or the server 810 may comprise the memory devices 840-1*a*-*n*, 840-2 or a portion thereof, for example.

Any processes described in this disclosure do not necessarily imply a fixed order to any depicted actions, steps, and/or procedures, and embodiments may generally be performed in any order that is practicable unless otherwise and specifically noted.

Figure 9:
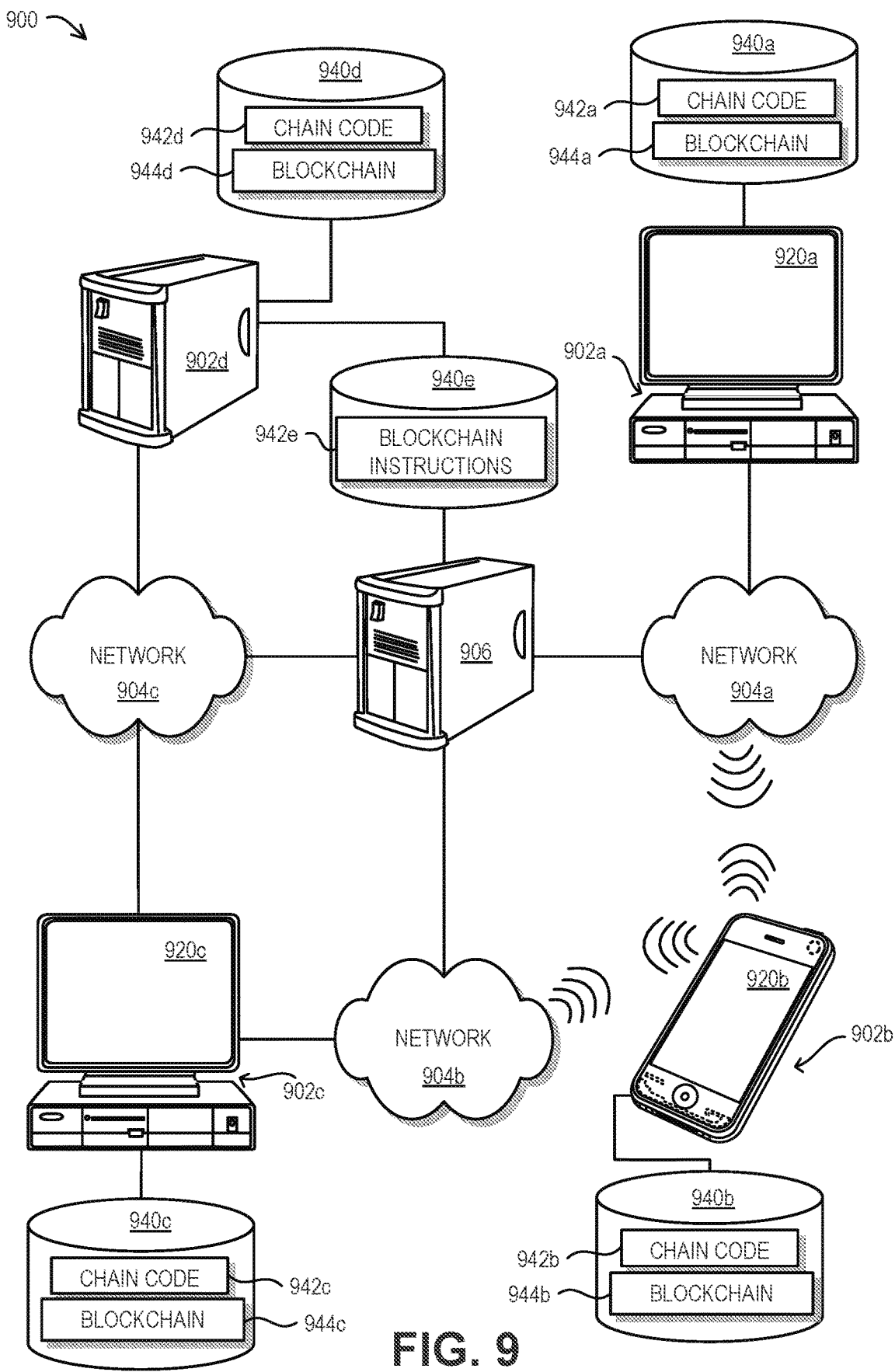
FIG. 9 is a diagram of a system according to some embodiments of the present invention.

Turning now to FIG. 9, a block diagram of a system 900 according to some embodiments is shown. In some embodiments, the system 900 may comprise a plurality of node devices 902*a*-*d*. In some embodiments, any of the node devices 902*a*-*d* may be in communication via any of networks 904*a*-*c* (e.g., the Internet, a cellphone network, and/or a short-range communication network) with one or more other node devices. In some embodiments, a blockchain services device 906 may be in communication with any or all of the node devices 902*a*-*d*, e.g., via the first network 904*a*, the second network 904*c*, and/or the third network 904*b*. According to some embodiments, the system 900 may comprise one or more interfaces 920*a*-*c*. Each of the node devices 902*a*-*c* may, for example, comprise and/or generate a first, second, or third interface 920*a*-*c*, respectively.

According to some embodiments, each device 902*a*-*d*, 906 may also or alternatively be in communication with and/or comprise a memory device 940*a*-*e* (e.g., any of which may be implemented and/or defined by an object data store and/or other data storage technique and/or service, such as utilizing the Amazon® Simple Storage Service (Amazon® S3™) available from Amazon.com, Inc. of Seattle, Wash. or an open-source third-party database service, such as MongoDB™ available from MongoDB, Inc. of New York, N.Y.).

In some embodiments, each memory device 940*a*-*e* may store various instructions and/or data utilized to effectuate a distributed ledger, as described herein. First, second, third, and/or fourth memory devices 940*a*-*d* coupled (physically and/or communicatively) to node devices 902*a*-*d*, respectively, may store for example, first, second, third, and fourth instances of chain code 942*a*-*d*, respectively. The chain code 942*a*-*d* may, in some embodiments, comprise specially-coded instructions that cause each respective device 902*a*-*d* to operate to generate and/or update a distributed ledger.

According to some embodiments, a fifth memory device 940*e* coupled (physically and/or communicatively) to the blockchain services device 906 may store blockchain instructions 942*e*. The blockchain instructions 942*e* may comprise, for example, specially-coded instructions that cause the blockchain services device 906 to be responsive to queries and/or data transmissions from any or all of the node devices 902*a*-*d*. The blockchain instructions 942*e* may cause, for example, creation and/or editing of a blockchain 944*a*-*d* having instances stored throughout the system 900 (e.g., in each of the first, second, third, and/or fourth memory devices 940*a*-*d*). In some embodiments, the blockchain instructions 942*e* may be accessible and/or executed by one or more of the node devices 902*a*-*d* (e.g., the node device 902*d* may operate in place of or in conjunction with the blockchain services device 906).

According to some embodiments, the blockchain 944*a-d* may comprise a private distributed ledger by being stored only on the devices 902*a-d* of the system 900. In some embodiments, the blockchain 944*a-d* may comprise a semi-private or public distributed ledger by including instances stored on additional devices, such as trusted or public devices, respectively (neither of which is shown). According to some embodiments, the chain code 942*a-d* may include instructions that direct the individual devices 902*a-d* to initiate a transmission of information (e.g., transactions and other digital messages) to the blockchain services device 906 (e.g., via one or more of the networks 904*a-c*).

The node device 902*a* may, for example, initiate distributed ledger creation by generating an initial or first instance of the blockchain 944*a* by executing a first instance of the chain code 942*a*. In the case that the node device 902*a* is utilized to initiate a transaction such as transfer payment, for example, information detailing the transaction may be cryptographically hashed or otherwise processed to generate the first instance of the blockchain 944*a*.

In some embodiments, the first instance of the chain code 942*a* may cause the information detailing the transaction (e.g., received via a first interface 920*a*) to be transmitted to the blockchain services device 906, e.g., via the first network 904*a*. The blockchain services device 906 may then, for example, conduct authentication, certification, and/or cryptographic processing of the information received from the node device 902*a* to generate and/or define the first instance of the blockchain 944*a*. According to some embodiments, the first instance of the blockchain 944*a* may be transmitted by the blockchain services device 906 to the node device 902*a*, e.g., causing the first instance of the blockchain 944*a* to be stored in the first memory device 940*a*.

According to some embodiments, such as in the case that an entity associated with the principal device 902*b* desires to provide some digital good in exchange for a transfer payment, a second instance of the chain code 942*b* may be executed. The second instance of the chain code 942*b* may, for example, cause information detailing a digital good (e.g., received via the second interface 920*b*) to be transmitted to the blockchain services device 906 (e.g., via the second network 904*b*). The blockchain services device 906 may then, for example, conduct authentication, certification, and/ or cryptographic processing of the information received from the node device 902*b* to generate and/or define the second instance of the blockchain 944*b*. According to some embodiments, the second instance of the blockchain 944*b* may be transmitted by the blockchain services device 906 to the node device 902*b*, e.g., causing the second instance of the blockchain 944*b* to be stored in the second memory device 940*b*.

Fewer or more components 902*a-d*, 904*a-c*, 906, 920*a-c*, 940*a-e*, 942*a-e*, 944*a-d* and/or various configurations of the depicted components 902*a-d*, 904*a-c*, 906, 920*a-c*, 940*a-e*, 942*a-e*, 944*a-d* may be included in the system 900 without deviating from the scope of embodiments described herein. In some embodiments, the system 900 (and/or one or more portions thereof) may comprise a distributed program, system, and/or platform programmed and/or otherwise configured to execute, conduct, and/or facilitate one or more of the methods described in this disclosure, and/or portions or combinations thereof.

Figure 10:
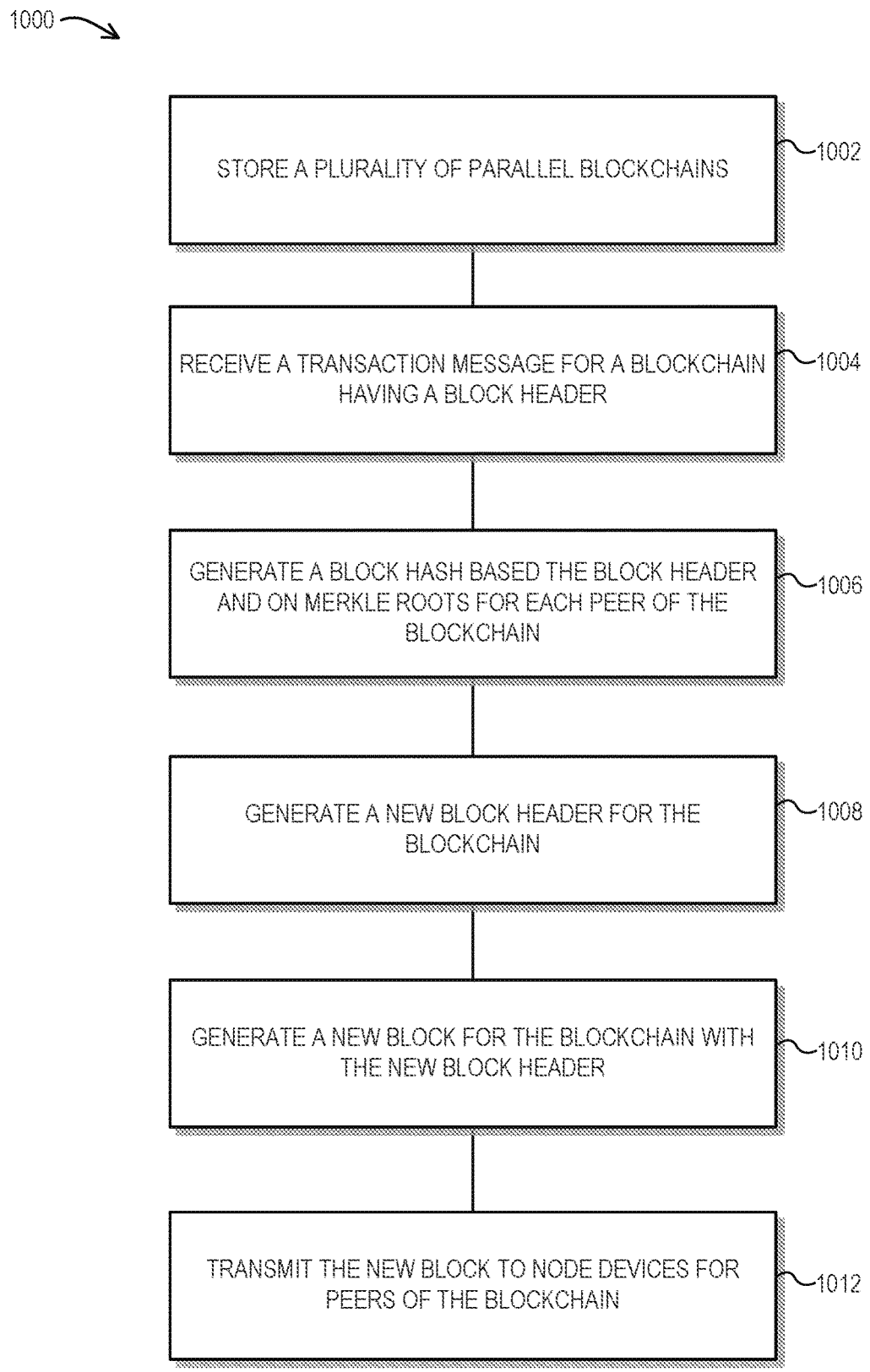
FIG. 10 is a flowchart of a method according to some embodiments of the present invention.

Referring now to FIG. 10, a flow diagram of a method 1000 according to some embodiments is shown. According to some embodiments, the method 1000 may comprise storing a plurality of parallel blockchains, at 1002, and receiving a transaction message for a blockchain having a block header, at 1004. In one embodiment, the method 1000 may further comprise generating a block hash based on the block header and on Merkle roots for each peer of the blockchain, at 1006, and generating a new block header for the blockchain, at 1008. The method 1000 may further comprise generating a new block for the blockchain with the new block header, at 1010, and transmitting the new block to node devices for peers of the blockchain, at 1012.

Figure 11:
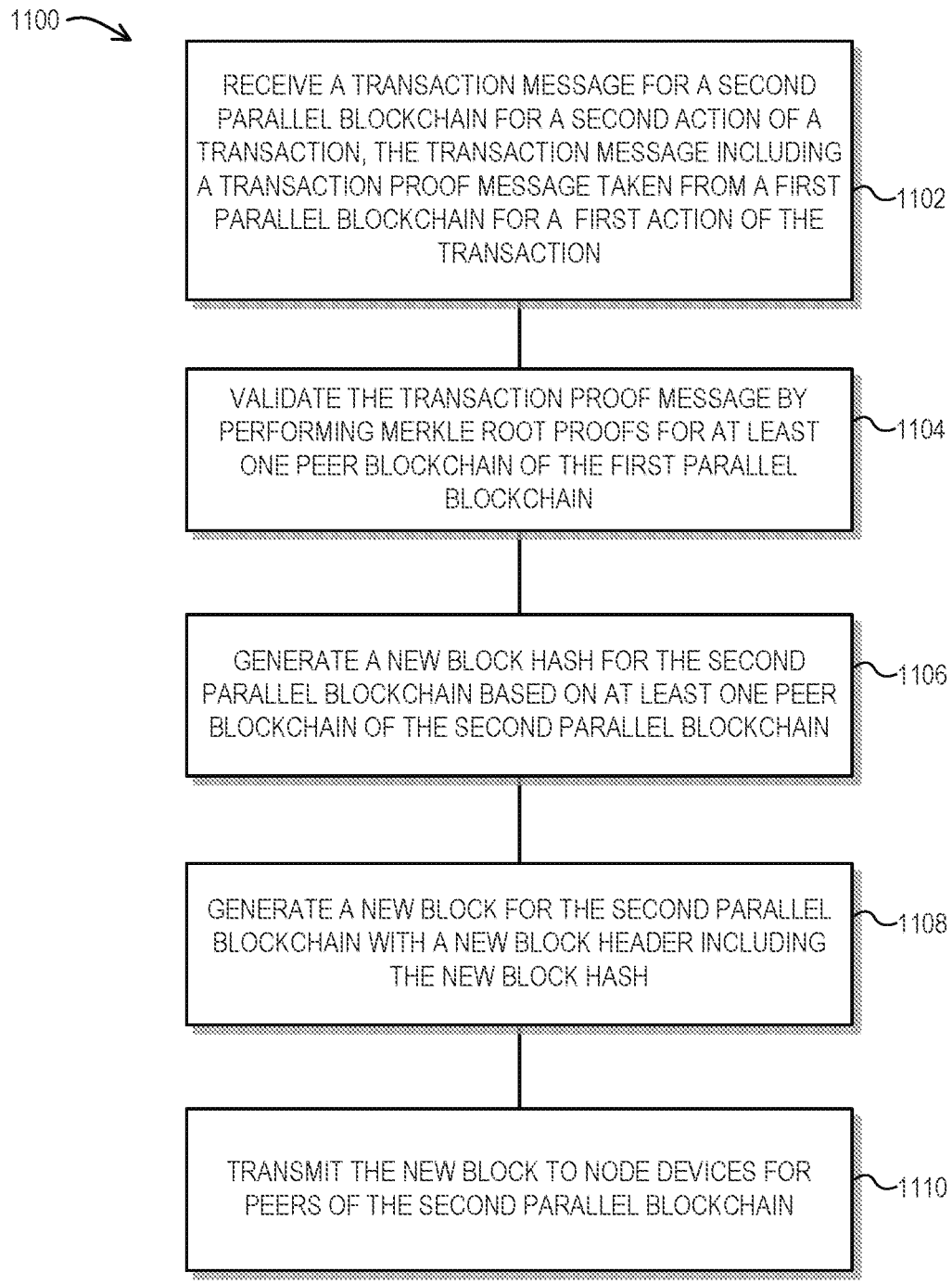
FIG. 11 is a flowchart of a method according to some embodiments of the present invention.

Referring now to FIG. 11, a flow diagram of a method 1100 according to some embodiments is shown. According to some embodiments, the method 1100 may comprise receiving a transaction message for a second parallel blockchain for a second action of a transaction, at 1102. In one embodiment, the transaction message comprises a transaction proof message taken from a first parallel blockchain for a first action of the transaction. According to some embodiments, the method 1100 may further comprise validating the transaction proof message by performing Merkle root proofs for at least one peer blockchain of the first parallel blockchain, at 1104. The method 1100 may further comprise generating a new block hash for the second parallel blockchain based on at least one peer blockchain of the second parallel blockchain, at 1106, and generating a new block for the second parallel blockchain with a new block header including the new block hash, at 1108. The method 1100 may further comprise transmitting the new block to node devices for peers of the second parallel blockchain, at 1110.

According to some embodiments, a cross-chain transaction may be implemented using a parallel-chain architecture. In one example, a transfer in a Chainweb network moves coin by deleting it in an account on one chain and creating it in an account on the other. The transfer process may comprise various steps. In this example transaction, coin is deleted on chain 1 from account A and then created on chain 2 in account B. Receipts are transaction records that are validated in SPV Merkle proofs. Values recovered from receipts may be stored, in accordance with some embodiments, in protocol-reserved fields to prevent spoofing. According to one embodiment, an SPV proof cannot be validated until the block is recorded in the opposite chain (and on any intermediate chains), so the initiator of the second step must wait until the corroborating Merkle roots are published and confirmed.

According to an example delete action taken on chain 1, a user signs and publishes a transaction, calling an example cx-delete function on the Chainweb platform with arguments A (identifying the delete account on chain 1), Y (the create chain), B (identifying the create account on chain 2), and $Q$ (transfer quantity). cx-delete performs the following:

(a) Enforce A keyset against signature.
(b) Enforce sufficient funds to delete $Q$ in A.
(c) Delete $Q$ from A.
(d) Receipt records X, Y, B, Q, T (a transaction ID that uniquely identifies the transaction) in protocol-reserved fields (i.e., fields reserved for access by the Chainweb protocol).

According to an example create action taken on chain 2, another user or entity publishes the transaction, calling a cx-create function with an SPV proof and receipt of the deletion part of the transaction on chain 1. cx-create performs the following:

(a) Validate SPV proof of deletion transaction, recovering X, Y, B, $\mathcal{Q}$, T from receipt.
(b) Enforce unique usage of (T, X).
(c) Enforce Y identifies the create chain (chain 2), and B is a valid account on Y
(d) Create $\mathcal{Q}$ in B.

According to some embodiments, a create action must first prove a delete. In accordance with various embodiments, a requirement of a transfer in a parallel-chain architecture like Chainweb is to create coin only once you can prove the corresponding deletion has provably occurred. Thus, in some embodiments, a create must accept and validate an SPV proof of a previous delete for the same quantity.

According to some embodiments, a delete must only allow one create. For example, the tuple of (T, X) in the previous example transaction forms a unique token that can only be used once by a given chain to create coins. The deletion's transaction ID (T) can only be consumed once, and this feature is enforced by the chain on which the creation occurs tracking which transaction IDs have been consumed. As the delete step dictates onto which chain the create step can occur, mass is conserved.

According to some embodiments, the owning user need only publish and sign the first. An opportunity thus arises for businesses to offer clearing services to handle the subsequent steps (e.g., one or more of the steps of cx-delete and/or cx-create described in the example above).

Figure 12:
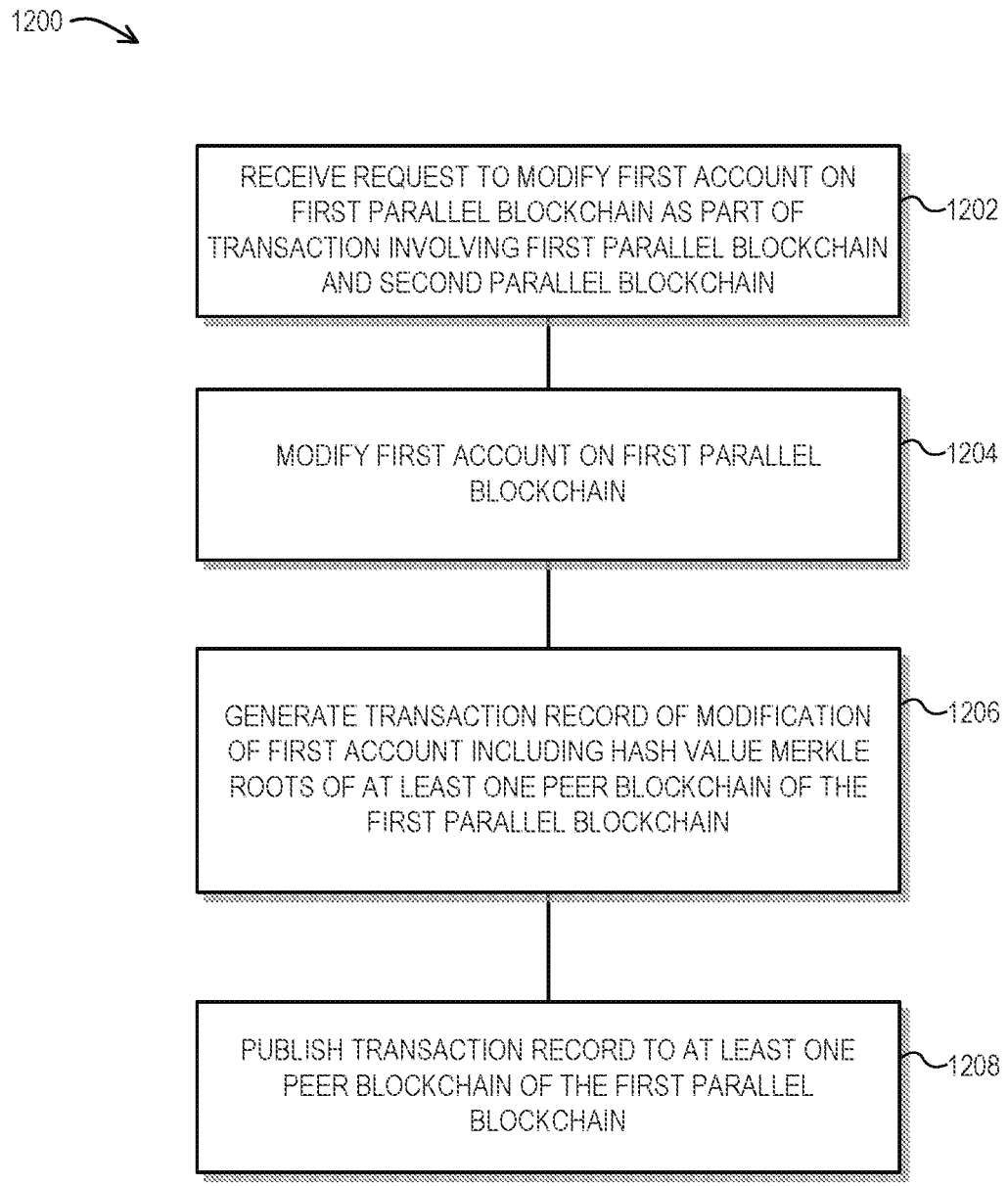
FIG. 12 is a flowchart of a method according to some embodiments of the present invention.

Referring now to FIG. 12, a flow diagram of a method 1200 according to some embodiments is shown. According to some embodiments, the method 1200 may comprise receiving a request to modify a first account on a first parallel blockchain as part of a transaction involving the first parallel blockchain and a second parallel blockchain, at 1202. According to some embodiments, the method 1200 may further comprise modifying the first account on the first parallel blockchain, at 1204, and generating a transaction record of the modification of the first account including hash value Merkle roots of at least one peer blockchain of the first parallel blockchain, at 1206. The method 1200 may further comprise publishing a transaction record to at least one peer blockchain of the first parallel blockchain, at 1208.

Figure 13:
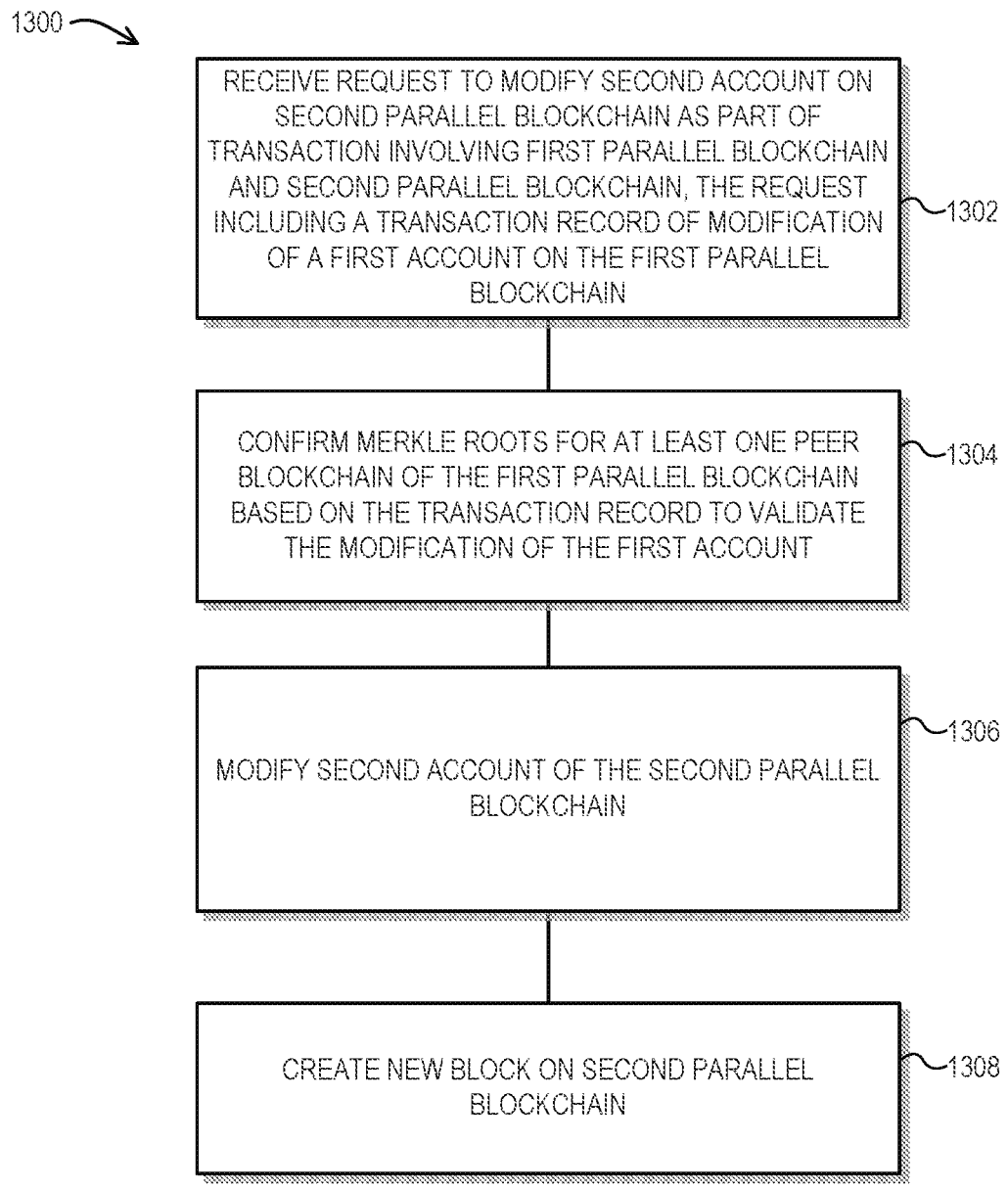
FIG. 13 is a flowchart of a method according to some embodiments of the present invention.

Referring now to FIG. 13, a flow diagram of a method 1300 according to some embodiments is shown. According to some embodiments, the method 1300 may comprise receiving a request to modify a second account on a second parallel blockchain as part of a transaction involving a first parallel blockchain and the second parallel blockchain, the request including a transaction record of modification of a first account on the first parallel blockchain, at 1302. According to some embodiments, the method 1300 may further comprise confirming Merkle roots for at least one peer blockchain of the first parallel blockchain based on the transaction record to validate the modification of the first account, at 1304, and modifying the second account of the second parallel blockchain, at 1306. The method 1300 may further comprise publishing creating a new block on the second parallel blockchain, at 1308.

Figure 14:
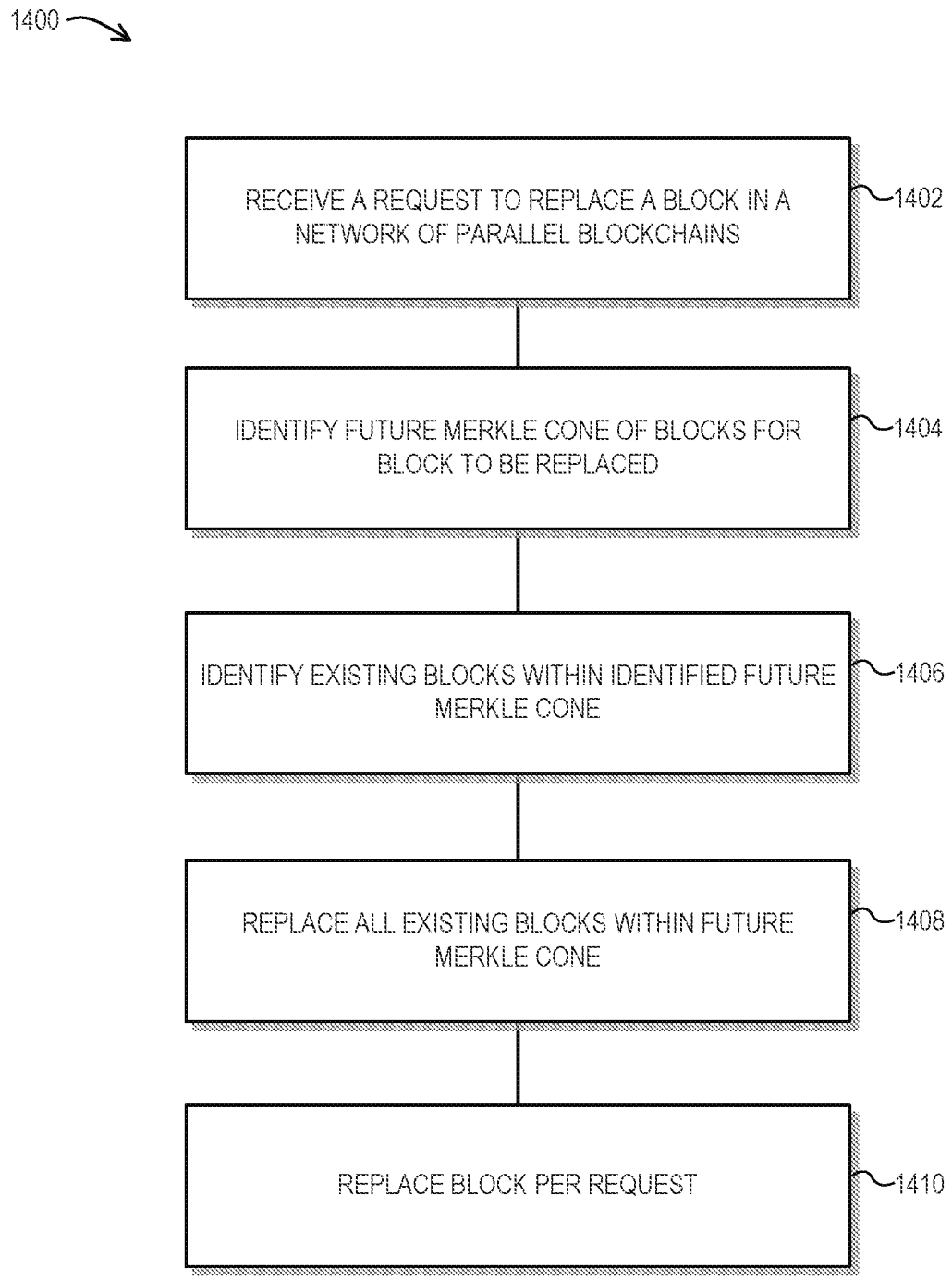
FIG. 14 is a flowchart of a method according to some embodiments of the present invention.

Referring now to FIG. 14, a flow diagram of a method 1400 according to some embodiments is shown. According to some embodiments, the method 1400 may comprise receiving a request to replace a block in a network of parallel blockchains, at 1402. According to some embodiments, the method 1400 may further comprise identifying a future Merkle cone of blocks for the block to be replaced, at 1404, and identifying existing blocks within the identified future Merkle cone, at 1406. The method 1400 may further comprise replacing all existing blocks within the future Merkle cone, at 1408, and replacing the block per the request, at 1410.

Figure 15:
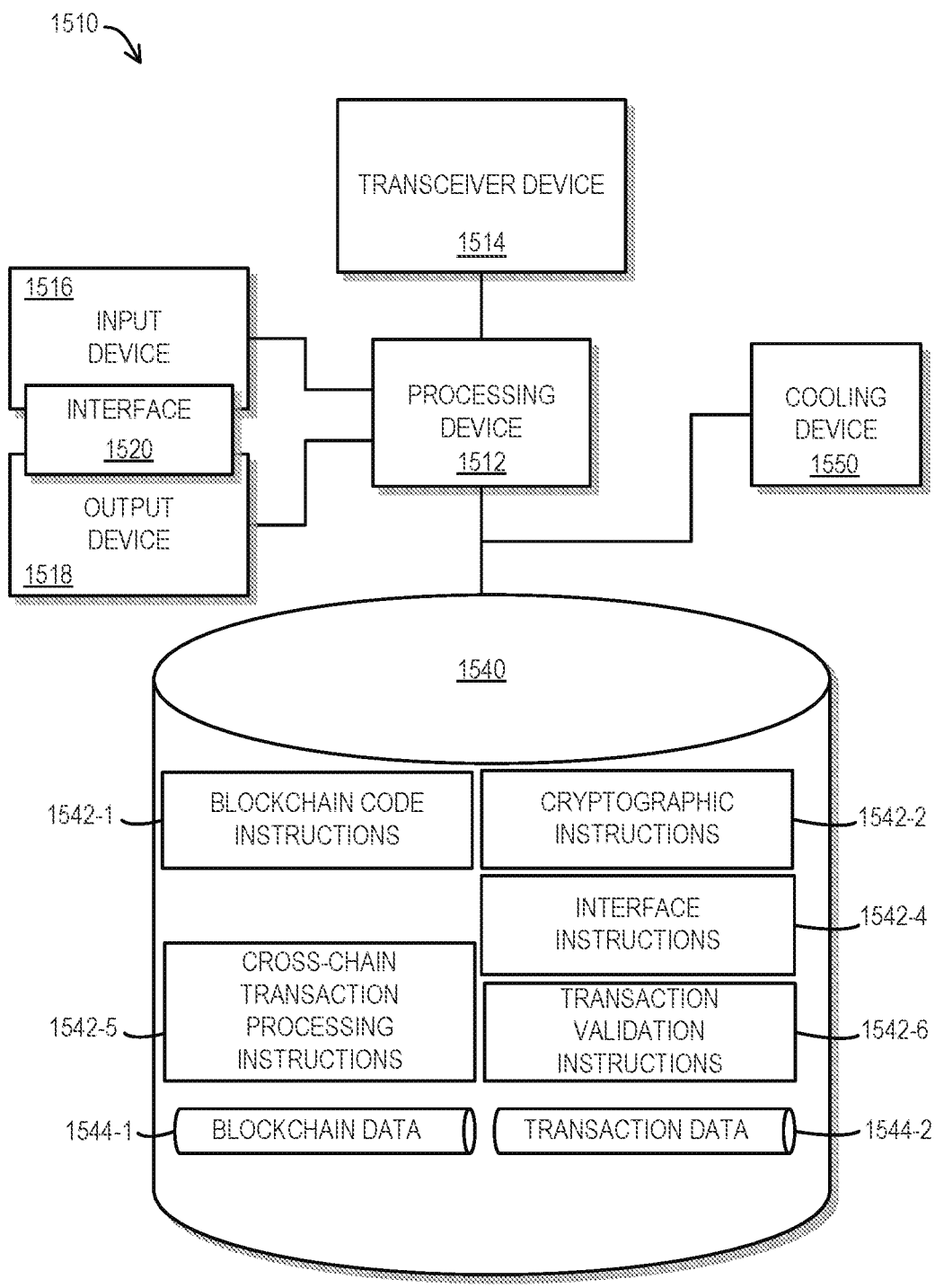
FIG. 15 is a block diagram of an apparatus according to some embodiments of the present invention.

Turning to FIG. 15, a block diagram of an apparatus 1510 according to some embodiments is shown. In some embodiments, the apparatus 1510 may be similar in configuration and/or functionality to any of the node devices 802a-n, 902a-d, and/or the devices 806, 806, and/or the server devices 810 described herein. The apparatus 1510 may, for example, execute, process, facilitate, and/or otherwise be associated with the one or more of the methods described herein, and/or portions or combinations thereof.

In some embodiments, the apparatus 1510 may comprise a processing device 1512, a transceiver device 1514, an input device 1516, an output device 1518, an interface 1520, a memory device 1540 (storing various programs and/or instructions 1542 and data 1544), and/or a cooling device 1550. Fewer or more components 1512, 1514, 1516, 1518, 1520, 1540, 1542, 1544, 1550 and/or various configurations of the components 1512, 1514, 1516, 1518, 1520, 1540, 1542, 1544, 1550 be included in the apparatus 1510 without deviating from the scope of embodiments described herein.

According to some embodiments, the processor 1512 may be or include any type, quantity, and/or configuration of processor that is or becomes known. The processor 1512 may comprise, for example, an Intel® IXP 2800 network processor, an Intel® XEON™ Processor coupled with an Intel® E7501 chipset, and/or one or more virtual processors (e.g., associated with a virtual machine). In some embodiments, the processor 1512 may comprise multiple interconnected processors, microprocessors, and/or micro-engines. According to some embodiments, the processor 1512 (and/or the apparatus 1510 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 1510 comprises a server, such as a blade server, necessary power may be supplied via a standard AC outlet, power strip, surge protector, and/or Uninterruptible Power Supply (UPS) device.

In some embodiments, the transceiver device 1514 may comprise any type or configuration of communication device that is or becomes known or practicable. The transceiver device 1514 may, for example, comprise a Network Interface Card (NIC), a telephonic device, a cellular network device, a router, a hub, a modem, and/or a communications port or cable. According to some embodiments, the transceiver device 1514 may also or alternatively be coupled to the processor 1512. In some embodiments, the transceiver device 1514 may comprise an IR, RF, Bluetooth™, Near-Field Communication (NFC), and/or Wi-Fi® network device coupled to facilitate communications between the processor 1512 and another device (not shown).

According to some embodiments, the input device 1516 and/or the output device 1518 are communicatively coupled to the processor 1512 (e.g., via wired and/or wireless connections and/or pathways) and they may generally comprise any types or configurations of input and output components and/or devices that are or become known, respectively. The input device 1516 may comprise, for example, a keyboard that allows an operator of the apparatus 1510 to interface with the apparatus 1510 (e.g., by a permissioned user in a blockchain system, such as to submit a request to submit transactions such as a transfer payment to another user that are recorded in a distributed ledger, as described herein).

The output device 1518 may, according to some embodiments, comprise a display screen and/or other practicable output component and/or device. The output device 1518 may, for example, provide an interface via which distributed ledger information is provided to a user (e.g., via a website and/or mobile application). According to some embodiments, the input device 1516 and/or the output device 1518 may comprise and/or be embodied in a single device, such as a touch-screen monitor.

The memory device 1540 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 1540 may, according to some embodiments, store one or more of blockchain code instructions 1542-1, cryptographic instructions 1542-2, interface instructions 1542-4, cross-chain transaction processing instructions 1542-5, transaction validation instructions 1542-6, blockchain data 1544-1, and/or transaction data 1544-2. In some embodiments, the blockchain code instructions 1542-1, cryptographic instructions 1542-2, interface instructions 1542-4, cross-chain transaction processing instructions 1542-5, transaction validation instructions 1542-6 may be utilized by the processor 1512 to provide output information via the output device 1518 and/or the transceiver device 1514.

According to some embodiments, the blockchain code instructions 1542-1 may be operable to cause the processor 1512 to process the blockchain data 1544-1 in accordance with embodiments as described herein. Blockchain data 1544-1 received via the input device 1516 and/or the transceiver device 1518 may, for example, be interpreted, compiled, analyzed, sorted, filtered, decoded, decompressed, ranked, scored, plotted, and/or otherwise processed by the processor 1512 in accordance with the blockchain code instructions 1542-1.

In some embodiments, the cryptographic instructions 1542-2 may be operable to cause the processor 1512 to process the blockchain data 1544-1 in accordance with embodiments as described herein (e.g., to generate hashes and/or other types of proof messages).

In some embodiments, the interface instructions 1542-4 may be operable to cause the processor 1512 to process the blockchain data 1544-1 and/or transaction data 1544-2 in accordance with embodiments as described herein (e.g., to allow users to submit transactions and/or smart contracts to a blockchain platform; to allow users to define keysets and associated privileges for one or more smart contracts).

In some embodiments, the cross-chain transaction processing instructions 1542-5 may be operable to cause the processor 1512 to process the blockchain data 1544-1 and/or transaction data 1544-2 in accordance with embodiments as described herein (e.g., to process transactions across blockchains in a parallel blockchain network; to regulate the appropriate generation (or prohibition) of generation of new blocks on a given blockchain in order to enforce configuration requirements specified in blockchain data 1544-1 and/or blockchain code instructions 1542-1).

In some embodiments, the transaction validation instructions 1542-6 may be operable to cause the processor 1512 to process the blockchain data 1544-1 and/or transaction data 1544-2 in accordance with embodiments as described herein (e.g., to conduct Merkle proof validation for cross-chain transactions). In one embodiment, the transaction validation module may check that a current set of the latest blocks are consistent with each other and with the network that a miner has already built and validated.

According to some embodiments, the apparatus 1510 may comprise the cooling device 1550. According to some embodiments, the cooling device 1550 may be coupled (physically, thermally, and/or electrically) to the processor 1512 and/or to the memory device 1540. The cooling device 1550 may, for example, comprise a fan, heat sink, heat pipe, radiator, cold plate, and/or other cooling component or device or combinations thereof, configured to remove heat from portions or components of the apparatus 1510.

Any or all of the exemplary instructions and data types described herein and other practicable types of data may be stored in any number, type, and/or configuration of memory devices that is or becomes known. The memory device 1540 may, for example, comprise one or more data tables or files, databases, table spaces, registers, and/or other storage structures. In some embodiments, multiple databases and/or storage structures (and/or multiple memory devices 1540) may be utilized to store information associated with the apparatus 1510. According to some embodiments, the memory device 1540 may be incorporated into and/or otherwise coupled to the apparatus 1510 (e.g., as shown) or may simply be accessible to the apparatus 1510 (e.g., externally located and/or situated).

Interpretation

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention may be practiced with various modifications and alterations, such as structural, logical, software, and/or electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features that must be present in all embodiments.

Neither the Title (set forth at the beginning of the first page of this disclosure) nor the Abstract (set forth at the end of this disclosure) is to be taken as limiting in any way the scope of the disclosed invention(s).

Throughout the description and unless otherwise specified, the following terms may include and/or encompass the example meanings provided below. These terms and illustrative example meanings are provided to clarify the language selected to describe embodiments both in the specification and in the appended claims, and accordingly, are not intended to be limiting.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term "process" or a like term. Accordingly, any reference in a claim to a "step" or "steps" of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

As used in this disclosure, a "user" may generally refer to any individual and/or entity that operates a user device.

Some embodiments may be associated with a "user device" or a "network device." As used in this disclosure, the terms "user device" and "network device" may be used interchangeably and may generally refer to any device that can communicate via a network. Examples of user or network devices include a personal computer (PC), a workstation, a server, a printer, a scanner, a facsimile machine, a copier, a personal digital assistant (PDA), a storage device (e.g., a disk drive), a hub, a router, a switch, and a modem, a video game console, or a wireless phone. User and network devices may comprise one or more communication or network components.

Some embodiments may be associated with a "network" or a "communication network". As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. In some embodiments, networks may be hard-wired, wireless, virtual, neural, and/or any other configuration or type of network that is or becomes known. Networks may comprise any number of computers and/or other types of devices in communication with one another, directly or indirectly, via a wired or wireless medium such as the Internet, LAN, WAN or Ethernet (or IEEE 802.3), Token Ring, RF, cable TV, satellite links, or via any appropriate communications means or combination of communications means. In some embodiments, a network may include one or more wired and/or wireless networks operated in accordance with any communication standard or protocol that is or becomes known or practicable. Exemplary protocols for network communications include but are not limited to: the Fast Ethernet LAN transmission standard 802.3-2002® published by the Institute of Electrical and Electronics Engineers (IEEE), Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Communication between and/or among devices may be encrypted to ensure privacy and/or prevent fraud in any one or more of a variety of ways well known in the art.

Devices that are in communication with each other need not be in continuous communication with each other, unless expressly specified otherwise. On the contrary, such devices need only transmit to each other as necessary or desirable and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

As used in this disclosure, the term "network component" may refer to a network device, or a component, piece, portion, or combination of a network device. Examples of network components may include a Static Random Access Memory (SRAM) device or module, a network processor, and a network communication path, connection, port, or cable.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication". The term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

"Determining" something may be performed in a variety of manners and therefore the term "determining" (and like terms) includes calculating, computing, deriving, looking up (e.g., in a table, database or data structure), ascertaining, recognizing, and the like.

A "processor" means any one or more microprocessors, Central Processing Unit (CPU) devices, computing devices, microcontrollers, digital signal processors, or like devices. Examples of processors include, without limitation, INTEL's PENTIUM, AMD's ATHLON, or APPLE's A6 processor.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate). Where more than one device or article is described in this disclosure (whether or not they cooperate), a single device or article may alternatively be used in place of the more than one device or article that is described. For example, a plurality of computer-based devices may be substituted with a single computer-based device. Accordingly, functionality that is described as being possessed by more than one device or article may alternatively be possessed by a single device or article. The functionality and/or the features of a single device that is described may be alternatively embodied by one or more other devices that are described but are not explicitly described as having such functionality and/or features. Thus, other embodiments need not include the described device itself, but rather can include the one or more other devices that would, in those other embodiments, have such functionality/features.

A description of an embodiment with several components or features does not imply that any particular one of such components and/or features is required. On the contrary, a variety of optional components are described to illustrate the wide variety of possible embodiments of the present invention(s). Unless otherwise specified explicitly, no component and/or feature is essential or required.

Further, although process steps, algorithms or the like may be described or depicted in a sequential order, such processes may be configured to work in one or more different orders. In other words, any sequence or order of steps that may be explicitly described or depicted does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications, does not imply that the illustrated process or any of its steps is necessary to the invention, and does not imply that the illustrated process is preferred.

It will be readily apparent that the various methods and algorithms described in this disclosure may be implemented by, e.g., appropriately- and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer-readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

Accordingly, a description of a process likewise describes at least one apparatus for performing the process, and likewise describes at least one computer-readable medium and/or computer-readable memory for performing the process. The apparatus that performs a described process may include components and/or devices (e.g., a processor, input and output devices) appropriate to perform the process. A computer-readable medium may store program elements and/or instructions appropriate to perform a described method.

The term "computer-readable medium" refers to any medium that participates in providing data (e.g., instructions or other information) that may be read by a computer, a processor, or a like device. Various forms of computer-readable media may be involved in carrying data, including sequences of instructions, to a processor. For example, sequences of instruction (i) may be delivered from RAM to a processor, (ii) may be carried over a wireless transmission medium, and/or (iii) may be formatted according to any one or more of various known formats, standards, or protocols (some examples of which are described in this disclosure with respect to communication networks).

Computer-readable media may take many forms, including but not limited to, non-volatile media, volatile media, and transmission media. Non-volatile media may include, for example, optical or magnetic disks and other types of persistent memory. Volatile media may include, for example, DRAM, which typically constitutes the main memory for a computing device. Transmission media may include, for example, coaxial cables, copper wire, and fiber optics, including the wires that comprise a system bus coupled to the processor. Transmission media may include or convey acoustic waves, light waves, and electromagnetic emissions, such as those generated during RF and IR data communications. Common forms of computer-readable media include, for example, a floppy disk, a flexible disk, a hard disk, magnetic tape, any other magnetic medium, a CD-ROM, DVD, any other optical medium, a punch card, paper tape, any other physical medium with patterns of holes, a RAM, a PROM, an EPROM, a FLASH-EEPROM, a Universal Serial Bus (USB) memory stick or thumb drive, a dongle, any other memory chip or cartridge, a carrier wave, or any other medium from which a computer can read.

The term "computer-readable memory" may generally refer to a subset and/or class of non-transitory computer-readable medium that does not include intangible or transitory signals, waves, waveforms, carrier waves, electromagnetic emissions, or the like. Computer-readable memory may typically include physical, non-transitory media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, USB devices, any other memory chip or cartridge, and the like.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries may be different from those described in this disclosure. Further, despite any depiction of the databases as tables, other formats (including relational databases, object-based models, hierarchical electronic file structures, and/or distributed databases) could be used to store and/or manipulate the described data. Likewise, object methods or behaviors of a database may be used to implement one or more of various processes, such as those described in this disclosure. In addition, the databases may, in a known manner, be stored locally and/or remotely from a device that accesses data in such a database. Furthermore, while unified databases may be contemplated, it is also possible that the databases may be distributed and/or duplicated amongst a variety of devices.

While the present invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

The present disclosure provides, to one of ordinary skill in the art, an enabling description of several embodiments and/or inventions. Some of these embodiments and/or inventions may not be claimed in the present application but may nevertheless be claimed in one or more continuing applications that claim the benefit of priority of the present application. Applicant reserves the right to file additional applications to pursue patents for subject matter that has been disclosed and enabled but not claimed in the present application.

What is claimed is:

1. A method for processing blocks using a parallel-blockchain architecture, comprising:
   storing, in a memory device of a blockchain processing server, a plurality of parallel blockchains including an initial set of blockchains, each blockchain of the initial set of blockchains comprising a respective initial set of blocks,
      wherein for a first blockchain of the initial set of blockchains, a first block of the initial set of blocks comprises a first block header that includes an initiating block hash,
      wherein a configuration of the plurality of parallel blockchains is defined by a diameter value defining a maximum number of inter-chain hops required to construct a Merkle validation proof between any two blockchains of the plurality of parallel blockchains,
      wherein each blockchain of the initial set of blockchains is associated with at least one peer blockchain;
   receiving, by a transceiver device in communication with the blockchain processing server, a transaction message from a node device;
   generating, by a cryptographic module of the blockchain processing server, a second block hash based on the first block header of the first block and on the corresponding Merkle root for each at least one peer blockchain of the first blockchain;
   generating, by a blockchain module of the blockchain processing server, a second block header for the first blockchain,
      wherein the second block header comprises the generated second block hash;
   generating, by the blockchain module of the blockchain processing server, a second block for the first blockchain,
      wherein the second block includes at least the generated second block header and the transaction message; and
   transmitting, by the transceiver device, the generated second block to one or more node devices associated with at least one peer blockchain of the first blockchain.

2. The method of claim 1, further comprising:
   generating, by the cryptographic module, a respective Merkle root for each at least one peer blockchain.

3. The method of claim 1, further comprising:
   receiving a respective Merkle root for each at least one peer blockchain from at least one node device.

4. The method of claim 1, wherein each parallel blockchain of the plurality of blockchains is independently mined.

5. The method of claim 1, wherein the transaction message is associated with a cross-chain cryptocurrency transfer.

6. The method of claim 1, wherein the transaction now abandoned message is associated with a transfer of cryptocurrency from an account of the first blockchain to an account of a second blockchain of the plurality of parallel blockchains.

7. The method of claim 1, wherein the transaction message is associated with a Merkle proof validation.

8. The method of claim 7, wherein the Merkle proof validation comprises a simple payment verification (SPV) smart contract.

9. The method of claim 1, further comprising:
receiving from a node device an SPV proof of value deletion for a second blockchain of the plurality of parallel blockchains.

10. The method of claim 9, further comprising:
validating the SPV proof of value deletion.

11. The method of claim 1, wherein the transaction message corresponds to a creation of value in an account on the first blockchain.

12. The method of claim 1, wherein the transaction message corresponds to a deletion of value in an account on the first blockchain.

13. The method of claim 1, wherein the second block header of the generated second block transmitted to the one or more node devices is incorporated in the next block header generated for each at least one peer blockchain of the first blockchain.

14. The method of claim 1, wherein the second block header of the generated second block, after being transmitted and subsequently received and processed by a second blockchain processing server of the one or more node devices associated with the at least one peer blockchain, is incorporated in the next block header generated for each at least one peer blockchain.

15. The method of claim 1, wherein the plurality of parallel blockchains is defined by at least one parameter defining interconnectedness of parallel blockchains.

16. The method of claim 1, wherein a configuration of the plurality of parallel blockchains is defined by at least one parameter of a corresponding graph.

17. The method of claim 1, wherein the configuration of the plurality of parallel blockchains is further defined by at least one of an order value and a degree value.

18. The method of claim 17, wherein the order value defines the total number of parallel blockchains in the plurality of parallel blockchains.

19. The method of claim 17, wherein the degree value defines a number of previous block headers of associated peer blockchains referenced by each blockchain of the plurality of parallel blockchains.

20. The method of claim 17, wherein each blockchain of the plurality of parallel blockchains comprises a first number of blocks, wherein the first number is within the diameter value of a respective number of blocks in any other blockchain in the plurality of parallel blockchains.

21. The method of claim 1, wherein each blockchain of the plurality of parallel blockchains comprises a set of blocks including a respective first block in the blockchain, and wherein each respective block header for each block of the set of blocks references all of the at least one peer blockchains associated with the blockchain of the plurality of parallel blockchains.

22. The method of claim 1, further comprising:
receiving, from a second node device by the blockchain processing server, a second transaction message for a second action of a transaction, the second transaction message comprising a transaction proof message for a first action of the transaction taken on the first blockchain of the plurality of parallel blockchains,
wherein the second action is associated with a second blockchain that is associated with the first blockchain.

23. The method of claim 22, further comprising:
validating, by the blockchain processing server, the transaction proof message to confirm successful completion of the first action of the transaction on the first blockchain.

24. The method of claim 22,
wherein the transaction proof message comprises a third block hash based on the generated second block header for the first blockchain; and
further comprising:
performing, based on the third block hash, a Merkle root proof for the first blockchain and for each of the at least one peer blockchain of the first blockchain.

25. The method of claim 1, further comprising:
determining a maximum blockheight difference for a parallel blockchain network comprising the plurality of parallel blockchains; and
determining whether to generate the second block for the first blockchain based on the maximum blockheight difference.

26. A method for processing blocks using a parallel-blockchain architecture, comprising:
storing, in a memory device of a blockchain processing server, a plurality of parallel blockchains including an initial set of blockchains, each blockchain of the initial set of blockchains comprising a respective initial set of blocks,
wherein for a first blockchain of the initial set of blockchains, a first block of the initial set of blocks comprises a first block header that includes an initiating block hash,
wherein each blockchain of the initial set of blockchains is associated with at least one peer blockchain;
receiving, by a transceiver device in communication with the blockchain processing server, a transaction message from a node device;
generating, by a cryptographic module of the blockchain processing server, a second block hash based on the first block header of the first block and on the corresponding Merkle root for each at least one peer blockchain of the first blockchain;
generating, by a blockchain module of the blockchain processing server, a second block header for the first blockchain,
wherein the second block header comprises the generated second block hash:
generating, by the blockchain module of the blockchain processing server, a second block for the first blockchain,
wherein the second block includes at least the generated second block header and the transaction message; and
transmitting, by the transceiver device, the generated second block to one or more node devices associated with at least one peer blockchain of the first blockchain,
wherein the plurality of parallel blockchains is configured for bounded asynchronous advancement.

27. The method of claim 26, wherein a configuration for bounded asynchronous advancement requires that if the first blockchain is of blockheight N, no other blockchain in the initial set of blockchains can be less than N−d blocks in blockheight or more than N+d blocks in blockheight, where d is the maximum blockheight difference.

28. A system for processing blocks using a parallel-blockchain architecture, the system comprising:
    a processing device; and
    a memory device in communication with the processing device, the memory device storing computer-readable instructions that when executed by the processing device direct the processing device to:
        store a plurality of parallel blockchains including an initial set of blockchains, each blockchain comprising an initial set of respective blocks,
            wherein for a first blockchain of the initial set of blockchains, a first block comprises a first block header that includes an initiating block hash,
            wherein a configuration of the plurality of parallel blockchains is defined by a diameter value defining a maximum number of inter-chain hops required to construct a Merkle validation proof between any two blockchains of the plurality of parallel blockchains,
            wherein each blockchain is associated with at least one peer blockchain;
        receive a transaction message from a node device;
        generate a second block hash based on the first block header of the first block and on the corresponding Merkle root for each at least one peer blockchain of the first blockchain;
        generate a second block header for the first blockchain, wherein the second block header comprises the generated second block hash;
        generate a second block for the first blockchain, wherein the second block includes at least the
        generated second block header and the transaction message; and
        transmit the generated second block to one or more node devices associated with at least one peer blockchain of the first blockchain.

* * * * *